US012713297B2

(12) United States Patent
Hu et al.

(10) Patent No.: US 12,713,297 B2
(45) Date of Patent: Aug. 18, 2026

(54) DISTRIBUTED-TONE RESOURCE UNIT OPERATION FOR WIDE BANDWIDTHS IN NEXT-GENERATION WLAN SYSTEMS

(71) Applicant: MediaTek Inc., Hsinchu City (TW)

(72) Inventors: Shengquan Hu, San Jose, CA (US); Jianhan Liu, San Jose, CA (US); Thomas Edward Pare, Jr., San Jose, CA (US)

(73) Assignee: MediaTek Inc., Hsinchu City (TW)

( * ) Notice: Subject to any disclaimer, the term of this patent is extended or adjusted under 35 U.S.C. 154(b) by 381 days.

(21) Appl. No.: 18/371,657

(22) Filed: Sep. 22, 2023

(65) Prior Publication Data

US 2024/0107381 A1 Mar. 28, 2024

Related U.S. Application Data

(60) Provisional application No. 63/377,055, filed on Sep. 26, 2022.

(51) Int. Cl.
*H04W 28/20* (2009.01)
*H04L 5/00* (2006.01)
*H04W 28/08* (2023.01)

(52) U.S. Cl.
CPC ........... *H04W 28/20* (2013.01); *H04L 5/0041* (2013.01); *H04L 5/0048* (2013.01); *H04W 28/0983* (2020.05)

(58) Field of Classification Search
CPC . H04L 27/2602; H04L 5/0007; H04L 5/0041; H04L 5/0044; H04L 5/0048; H04L 5/0094; H04W 28/0983; H04W 28/20
USPC .......................................................... 370/329
See application file for complete search history.

(56) References Cited

U.S. PATENT DOCUMENTS

2004/0208150 A1* 10/2004 Chang .................. H04W 92/02 370/338
2021/0143955 A1* 5/2021 Yang ..................... H04L 5/0048
2021/0392661 A1* 12/2021 Cao ................... H04W 72/0453
2022/0255690 A1* 8/2022 Hu ........................ H04L 1/0008
2022/0263636 A1 8/2022 Hu et al.
2022/0271985 A1* 8/2022 Lopez ................. H04L 27/2675
2024/0072863 A1* 2/2024 Suh ....................... H04L 1/0026
2024/0365302 A1* 10/2024 Hu .................... H04W 72/0453
2024/0365320 A1* 10/2024 Yang ................. H04W 72/0453
2024/0372685 A1* 11/2024 Hu ...................... H04W 52/262
2024/0372688 A1* 11/2024 Hu ........................ H04L 5/0053
2025/0310066 A1* 10/2025 Noh ...................... H04L 5/0094

OTHER PUBLICATIONS

European Patent Office, Extended European Search Report in European Patent Application No. 23199369.2-1213, Mar. 5, 2024.

* cited by examiner

*Primary Examiner* — Stephen J Clawson
(74) *Attorney, Agent, or Firm* — Andy M. Han; Han IP PLLC

(57) ABSTRACT

Various schemes pertaining to distributed-tone resource unit (dRU) operation for wide bandwidths next-generation wireless local area network (WLAN) systems are described. A communication entity generates at least one dRU or both the at least one dRU and at least one regular resource unit (rRU). The communication entity then communicates wirelessly using the at least one dRU or using the at least one dRU and the at least one rRU in a 160 MHz, 240 MHz, 320 MHz, 480 MHz or 640 MHz bandwidth.

18 Claims, 17 Drawing Sheets

100

110

120

Wireless Communications in a Wireless Local Area Network (WLAN) System with Distributed-Tone Resource Unit (dRU) Operation for Wide Bandwidths

100

110

120

500

Figure 17:
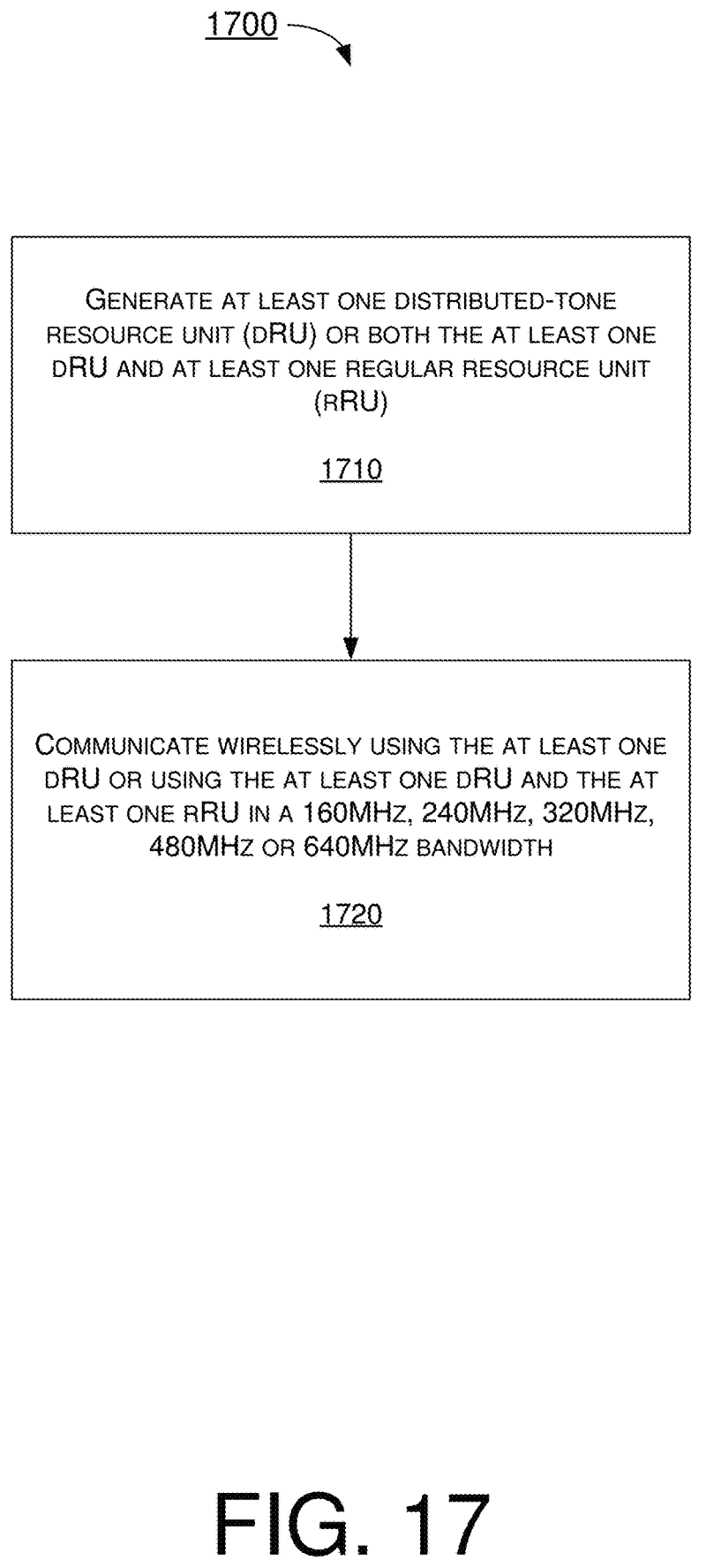

1700

GENERATE AT LEAST ONE DISTRIBUTED-TONE RESOURCE UNIT (DRU) OR BOTH THE AT LEAST ONE DRU AND AT LEAST ONE REGULAR RESOURCE UNIT (RRU)

1710

COMMUNICATE WIRELESSLY USING THE AT LEAST ONE DRU OR USING THE AT LEAST ONE DRU AND THE AT LEAST ONE RRU IN A 160MHZ, 240MHZ, 320MHZ, 480MHZ OR 640MHZ BANDWIDTH

DISTRIBUTED-TONE RESOURCE UNIT OPERATION FOR WIDE BANDWIDTHS IN NEXT-GENERATION WLAN SYSTEMS

CROSS REFERENCE TO RELATED PATENT APPLICATION

The present disclosure is part of a non-provisional patent application claiming the priority benefit of U.S. Provisional Patent Application No. 63/377,055, filed 26 Sep. 2022, the content of which being incorporated by reference in its entirety.

TECHNICAL FIELD

The present disclosure is generally related to wireless communications and, more particularly, to distributed-tone resource unit (dRU) operation for wide bandwidths next-generation wireless local area network (WLAN) systems.

BACKGROUND

Unless otherwise indicated herein, approaches described in this section are not prior art to the claims listed below and are not admitted as prior art by inclusion in this section.

In wireless communications, such as Wi-Fi (or WiFi) and WLAN under one or more Institute of Electrical and Electronics Engineers (IEEE) specifications, distributed-tone RUs, or dRUs, are utilized to boost transmission power for low-power indoor (LPI) systems in the 6 GHz frequency band. Other than existing bandwidths of 20 MHz, 40 MHz, 80 MHz, 160 MHz and 320 MHz in IEEE 802.11be, some other wider bandwidths, such as 240 MHz, 480 MHz and 640 MHz, may also be potentially supported in next-generation WLANs. In addition, the resource unit (RU) tones distributed over a wider bandwidth of 160 MHz, 240 MHz, 320 MHz or 480 MHz are considered for 6 GHz LPI systems to enhance coverage range and to improve data rate. Furthermore, client stations (STAs) may support different bandwidth sizes. For example, some STAs may limit the bandwidth to 80 MHz while other STAs may support a wider bandwidth such as 160 MHz or 320 MHz. Thus, dRUs with mixed-distribution bandwidth may be necessary for devices of different bandwidth capabilities. Therefore, there is a need for a solution of different dRU transmission schemes on wider bandwidths for next-generation WLAN systems.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to provide schemes, concepts, designs, techniques, methods and apparatuses pertaining to dRU operation for wide bandwidths next-generation WLAN systems.

In one aspect, a method may involve generating at least one dRU or both the at least one dRU and at least one regular resource unit (rRU). The method may also involve communicating wirelessly using the at least one dRU or using the at least one dRU and the at least one rRU in a 160 MHz, 240 MHz, 320 MHz, 480 MHz or 640 MHz bandwidth.

In another aspect, an apparatus may include a transceiver configured to communicate wirelessly and a processor coupled to the transceiver. The processor may generate at least one dRU or both the at least one dRU and at least one rRU. The processor may also communicate wirelessly using the at least one dRU or using the at least one dRU and the at least one rRU in a 160 MHz, 240 MHz, 320 MHz, 480 MHz or 640 MHz bandwidth.

It is noteworthy that, although description provided herein may be in the context of certain radio access technologies, networks and network topologies such as Wi-Fi and wireless local area network (WLAN) under pertinent Institute of Electrical and Electronics Engineers (IEEE) 802.11 standards, the proposed concepts, schemes and any variation(s)/derivative(s) thereof may be implemented in, for and by other types of radio access technologies, networks and network topologies such as, for example and without limitation, Bluetooth, ZigBee, 5th Generation (5G)/New Radio (NR), Long-Term Evolution (LTE), LTE-Advanced, LTE-Advanced Pro, Internet-of-Things (IoT), Industrial IoT (IIoT) and narrowband IoT (NB-IoT). Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation to clearly illustrate the concept of the present disclosure.

FIG. 17 is a flowchart of an example process in accordance with an implementation of the present disclosure.

DETAILED DESCRIPTION OF PREFERRED EMBODIMENTS

Figure 1:
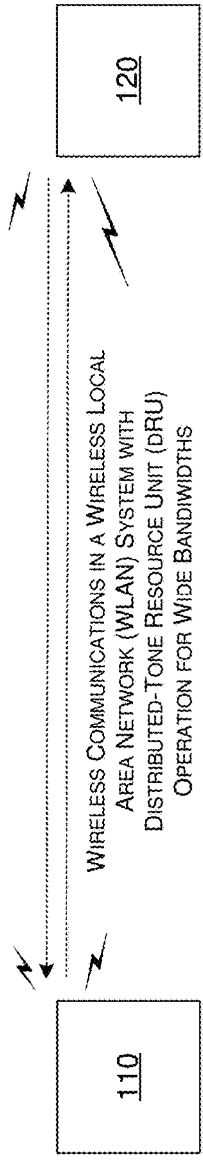
FIG. 1 is a diagram of an example network environment in which various solutions and schemes in accordance with the present disclosure may be implemented.

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to dRU operation for wide bandwidths next-generation WLAN systems. According to the present disclosure, a number of possible solutions may be implemented separately or jointly. That is, although these possible solutions may be described below separately, two or more of these possible solutions may be implemented in one combination or another.

It is noteworthy that, in the present disclosure, a regular RU (rRU) refers to a RU with tones that are continuous (e.g., adjacent to one another) and not interleaved, interlaced or otherwise distributed. Moreover, a 26-tone regular RU may be interchangeably denoted as RU26 (or rRU26), a 52-tone regular RU may be interchangeably denoted as RU52 (or rRU52), a 106-tone regular RU may be interchangeably denoted as RU106 (or rRU106), a 242-tone regular RU may be interchangeably denoted as RU242 (or rRU242), and so on. Moreover, an aggregate (26+52)-tone regular multi-RU (MRU) may be interchangeably denoted as MRU78 (or rMRU78), an aggregate (26+106)-tone regular MRU may be interchangeably denoted as MRU132 (or rMRU132), and so on.

It is noteworthy that, in the present disclosure, a distributed-tone RU (dRU) refers to a RU with tones that are non-continuous (e.g., not adjacent to one another) and interleaved, interlaced or otherwise distributed. Moreover, a 26-tone distributed-tone RU may be interchangeably denoted as dRU26, a 52-tone distributed-tone RU may be interchangeably denoted as dRU52, a 106-tone distributed-tone RU may be interchangeably denoted as dRU106, a 242-tone distributed-tone RU may be interchangeably denoted as dRU242, and so on.

It is also noteworthy that, in the present disclosure, a bandwidth of 20 MHz may be interchangeably denoted as BW20 or BW20M, a bandwidth of 40 MHz may be interchangeably denoted as BW40 or BW40M, a bandwidth of 80 MHz may be interchangeably denoted as BW80 or BW80M, a bandwidth of 160 MHz may be interchangeably denoted as BW160 or BW160M, a bandwidth of 240 MHz may be interchangeably denoted as BW240 or BW240M, a bandwidth of 320 MHz may be interchangeably denoted as BW320 or BW320M, a bandwidth of 480 MHz may be interchangeably denoted as BW480 or BW480M, a bandwidth of 500 MHz may be interchangeably denoted as BW500 or BW500M, a bandwidth of 520 MHz may be interchangeably denoted as BW520 or BW520M, a bandwidth of 540 MHz may be interchangeably denoted as BW540 or BW540M, a bandwidth of 640 MHz may be interchangeably denoted as BW640 or BW640M.

It is further noteworthy that the terms "frequency segment", "segment", "frequency subblock" and "subblock" are used interchangeably in the present disclosure.

FIG. 1 illustrates an example network environment 100 in which various solutions and schemes in accordance with the present disclosure may be implemented. FIG. 2~FIG. 17 illustrate examples of implementation of various proposed schemes in network environment 100 in accordance with the present disclosure. The following description of various proposed schemes is provided with reference to FIG. 1~FIG. 17.

Referring to FIG. 1, network environment 100 may involve at least a station (STA) 110 communicating wirelessly with a STA 120. Either of STA 110 and STA 120 may be an access point (AP) STA or, alternatively, either of STA 110 and STA 120 may function as a non-AP STA. In some cases, STA 110 and STA 120 may be associated with a basic service set (BSS) in accordance with one or more IEEE 802.11 standards (e.g., IEEE 802.11be and future-developed standards). Each of STA 110 and STA 120 may be configured to communicate with each other by utilizing the various proposed schemes of dRU operation for wide bandwidths next-generation WLAN systems in accordance with various proposed schemes described below. That is, either or both of STA 110 and STA 120 may function as a "user" in the proposed schemes and examples described below. It is noteworthy that, while the various proposed schemes may be individually or separately described below, in actual implementations some or all of the proposed schemes may be utilized or otherwise implemented jointly. Of course, each of the proposed schemes may be utilized or otherwise implemented individually or separately.

Figure 2:
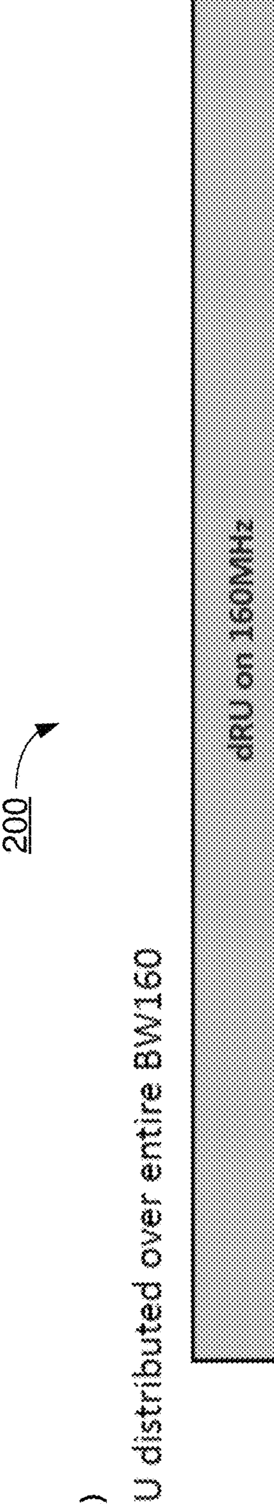
FIG. 2 is a diagram of an example scenario in accordance with an implementation of the present disclosure.

FIG. 2 illustrates an example scenario 200 under a proposed scheme in accordance with the present disclosure. Scenario 200 may pertain to dRU operation modes in a 160 MHz bandwidth (BW160). Part (A) of FIG. 2 shows an example of dRU distributed over the entire BW160. Part (B) of FIG. 2 shows an example of per-80 MHz operation mode over the BW160, with one dRU distributed over a first (e.g., primary) 80 MHz frequency segment or subblock and another dRU distributed over a second (e.g., secondary) 80 MHz frequency segment or subblock. Part (C) of FIG. 2 shows an example of a dRU and rRU mixed-operation mode over the BW160, with one rRU distributed over a first 80 MHz frequency segment or subblock and one dRU distributed over a second (80 MHz frequency segment or subblock. Part (D) of FIG. 2 shows an example of dRU with punctured mode in a BW80 of the BW160, with one dRU distributed over a first 80-MHz frequency segment or subblock and another dRU distributed over a second 80 MHz frequency segment or subblock in which a BW20 is punctured (leaving the dRU distributed over the remaining BW20 and BW40).

Figure 3:
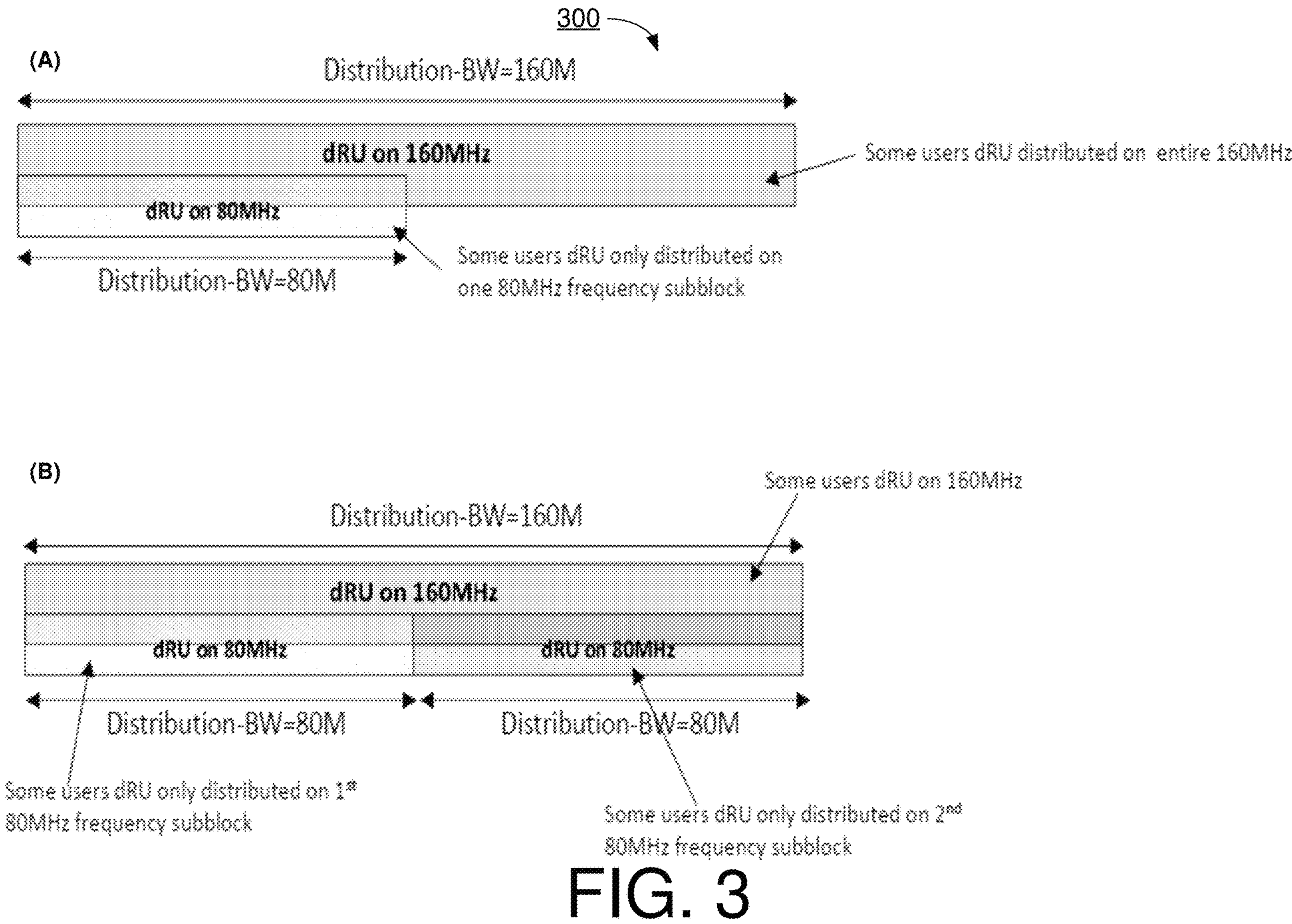
FIG. 3 is a diagram of an example scenario in accordance with an implementation of the present disclosure.

FIG. 3 illustrates an example scenario 300 under a proposed scheme in accordance with the present disclosure. Scenario 300 may pertain to dRU transmission with mixed-distribution bandwidth on BW160. Part (A) of FIG. 3 shows an example with one dRU distributed over the entire BW160 for one or more users (e.g., STAs) and another dRU distributed over a primary or secondary 80 MHz frequency segment or subblock of the BW160 for one or more other users (e.g., STAs). Part (B) of FIG. 3 shows an example with one dRU distributed over the entire BW160 for one or more users (e.g., STAs), another dRU distributed over a primary 80 MHz frequency segment or subblock of the BW160 for one or more other users (e.g., STAs), and yet another dRU distributed over a secondary 80 MHz frequency segment or subblock of the BW160 for one or more other users (e.g., STAs).

Figure 4:
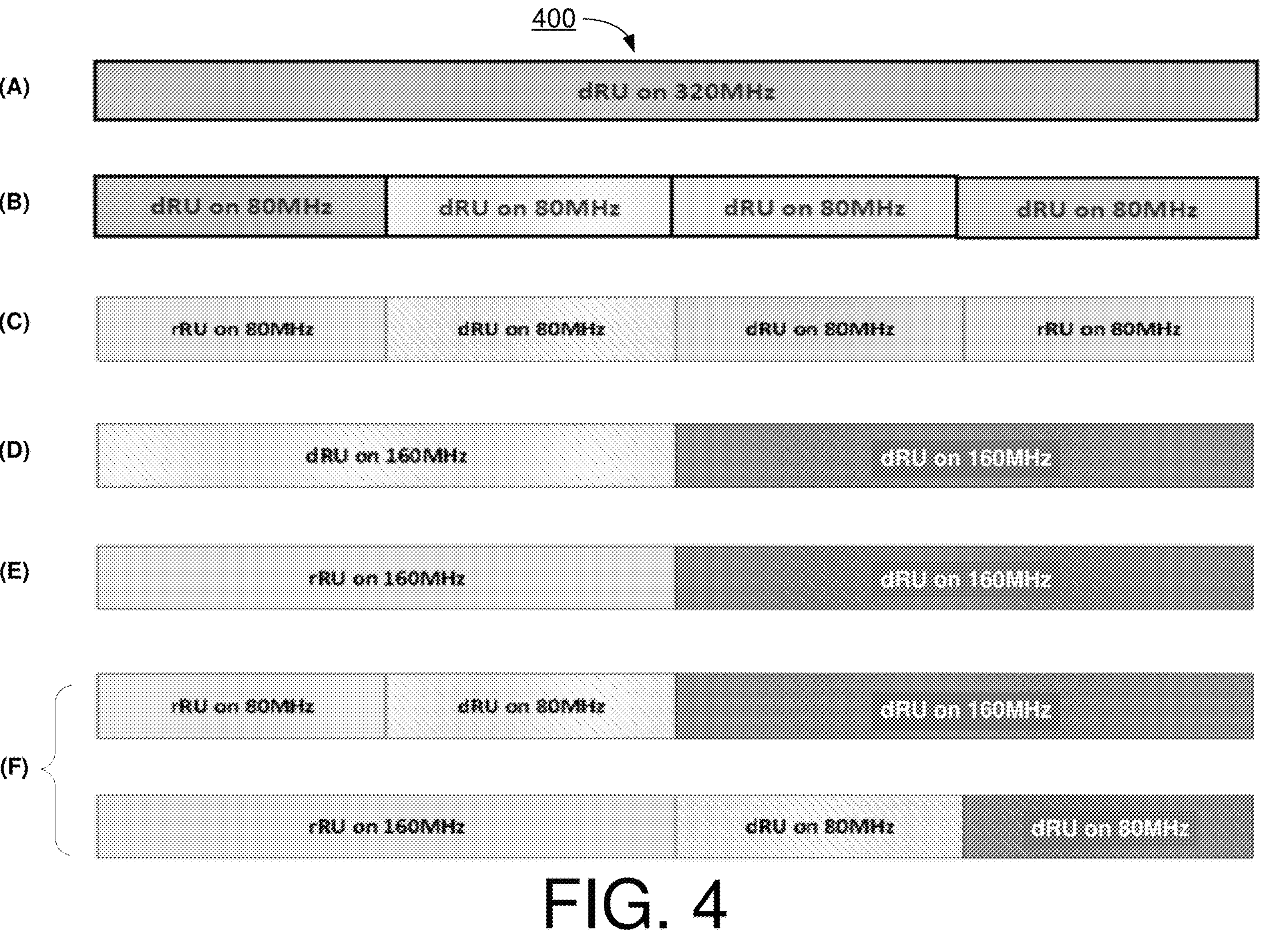
FIG. 4 is a diagram of an example scenario in accordance with an implementation of the present disclosure.

FIG. 4 illustrates an example scenario 400 under a proposed scheme in accordance with the present disclosure. Scenario 400 may pertain to dRU transmission modes on BW320. Part (A) of FIG. 4 shows an example of a dRU distributed over the entire BW320. Part (B) of FIG. 4 shows an example of dRUs distributed on a per-80 MHz subblock basis on the BW320. Part (C) of FIG. 4 shows an example of hybrid (or mixed) operation mode of dRU and rRU on a per-80 MHz subblock basis on the BW320. Part (D) of FIG. 4 shows an example of dRUs distributed on a per-160 MHz subblock basis on the BW320. Part (E) of FIG. 4 shows an example of hybrid (or mixed) operation mode of dRU and rRU on a per-160 MHz subblock basis on the BW320. Part (F) of FIG. 4 shows an example of hybrid (or mixed) operation mode of dRU and rRU on a mixed-80 MHz and 160 MHz subblock basis on the BW320.

Figure 5:
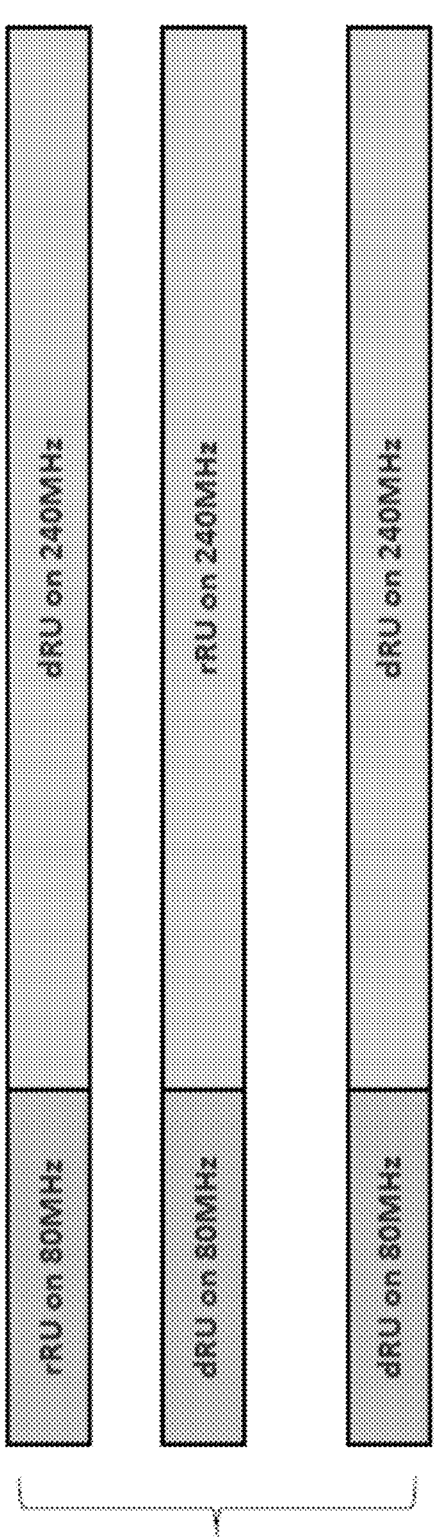
FIG. 5 is a diagram of an example scenario in accordance with an implementation of the present disclosure.

FIG. 5 illustrates an example scenario 500 under a proposed scheme in accordance with the present disclosure. Scenario 500 may pertain to dRU transmission modes on BW320. Specifically, FIG. 5 shows an example of hybrid (or mixed) operation mode of dRU and rRU on a mixed-80 MHz and 240 MHz subblock basis on the BW320.

Figure 6:
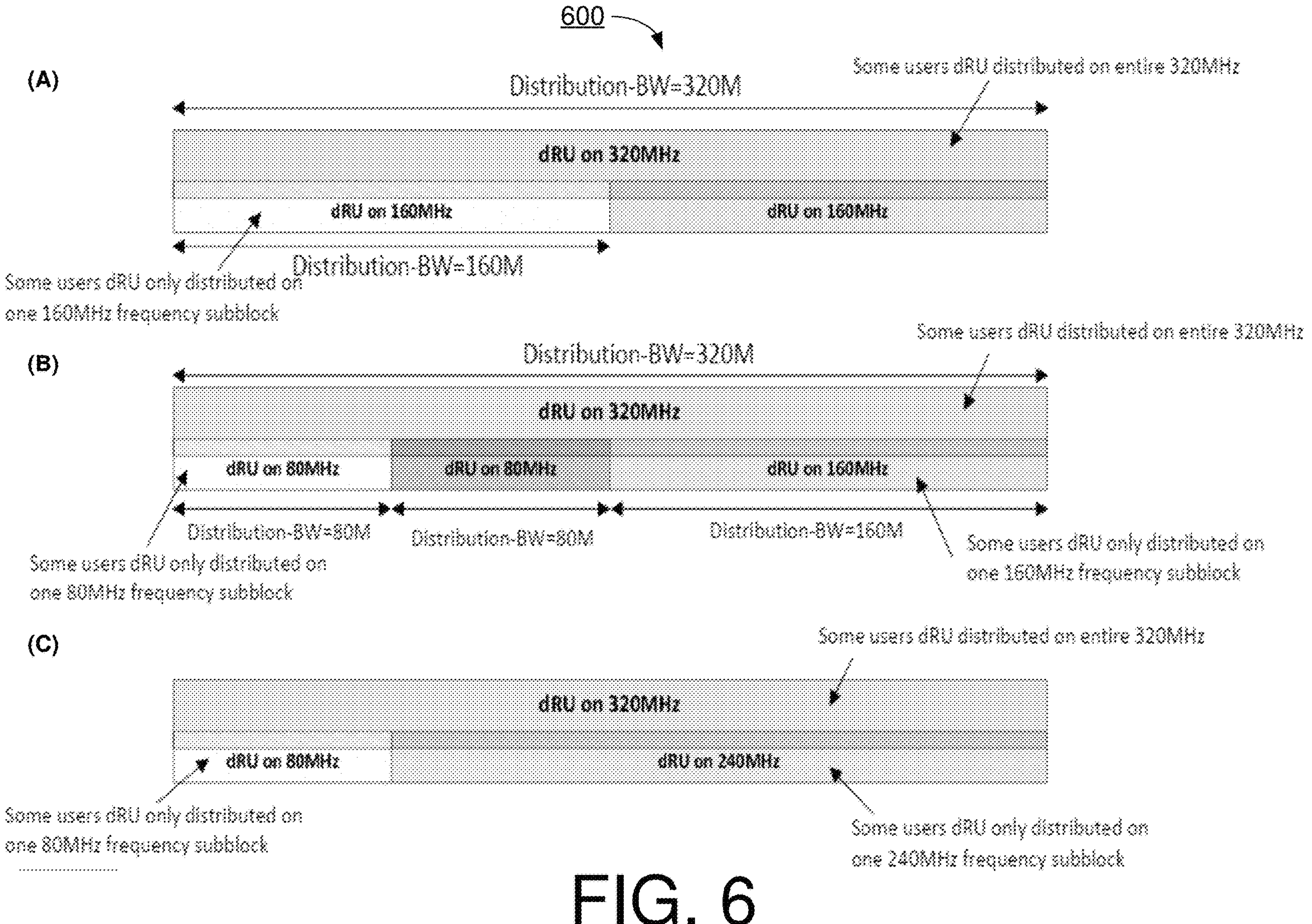
FIG. 6 is a diagram of an example scenario in accordance with an implementation of the present disclosure.

FIG. 6 illustrates an example scenario 600 under a proposed scheme in accordance with the present disclosure. Scenario 600 may pertain to dRU transmission with mixed-distribution bandwidth on BW320. Part (A) of FIG. 6 shows an example with one dRU distributed over the entire BW320 for one or more users (e.g., STAs), another dRU distributed over a primary 160 MHz frequency segment or subblock of the BW320 for one or more other users (e.g., STAs), and yet another dRU distributed over a secondary 160 MHz frequency segment or subblock of the BW320 for one or more other users (e.g., STAs). Part (B) of FIG. 6 shows an example with one dRU distributed over the entire BW320 for one or more users (e.g., STAs), one dRU distributed over a primary 80 MHz frequency segment or subblock of a primary 160 MHz frequency segment or subblock of the BW320 for one or more other users (e.g., STAs), another dRU distributed over a secondary 80 MHz frequency segment or subblock of the primary 160 MHz frequency segment or subblock of the BW320 for one or more other users (e.g., STAs), and yet another dRU distributed over a secondary 160 MHz frequency segment or subblock of the BW320 for one or more other users (e.g., STAs). Part (C) of FIG. 6 shows an example with one dRU distributed over the entire BW320 for one or more users (e.g., STAs), another dRU distributed over a 80 MHz frequency segment or subblock of the BW320 for one or more other users (e.g., STAs), and yet another dRU distributed over a 240 MHz frequency segment or subblock of the BW320 for one or more other users (e.g., STAs).

Figure 7:
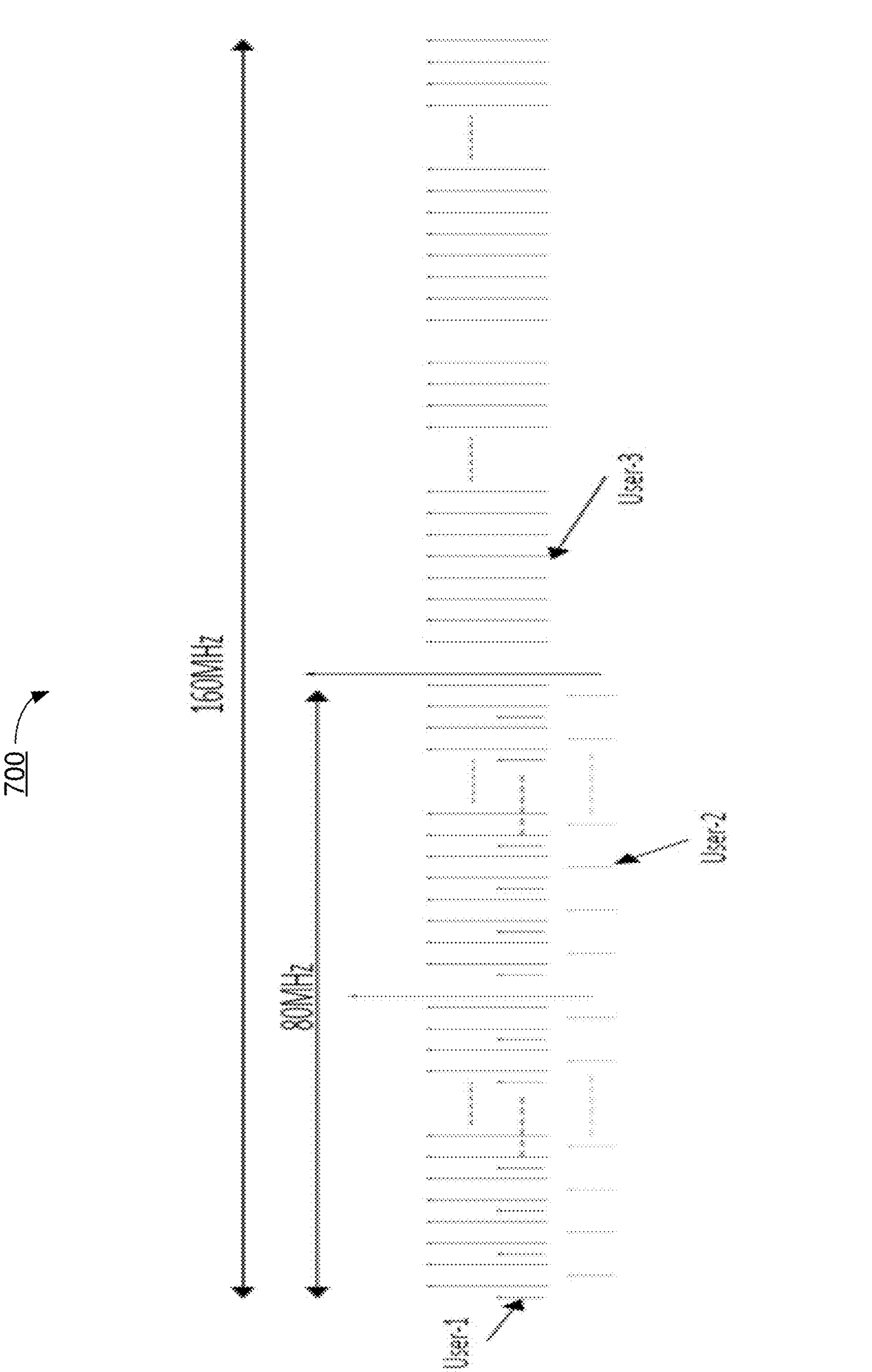
FIG. 7 is a diagram of an example scenario in accordance with an implementation of the present disclosure.

FIG. 7 illustrates an example scenario 700 under a proposed scheme in accordance with the present disclosure. Scenario 700 may pertain to dRU with mixed-distribution bandwidth orthogonal frequency-division multiple access (OFDMA) on BW160. Referring to FIG. 7, a first dRU242 for a first user (User-1) may be distributed over a primary 80 MHz frequency segment or subblock of the BW160, a second dRU242 for a second user (User-2) may be distributed over the primary 80 MHz frequency segment or subblock of the BW160, and a dRU996 for a third user (User-3) may be distributed over the entire BW160.

Figure 8:
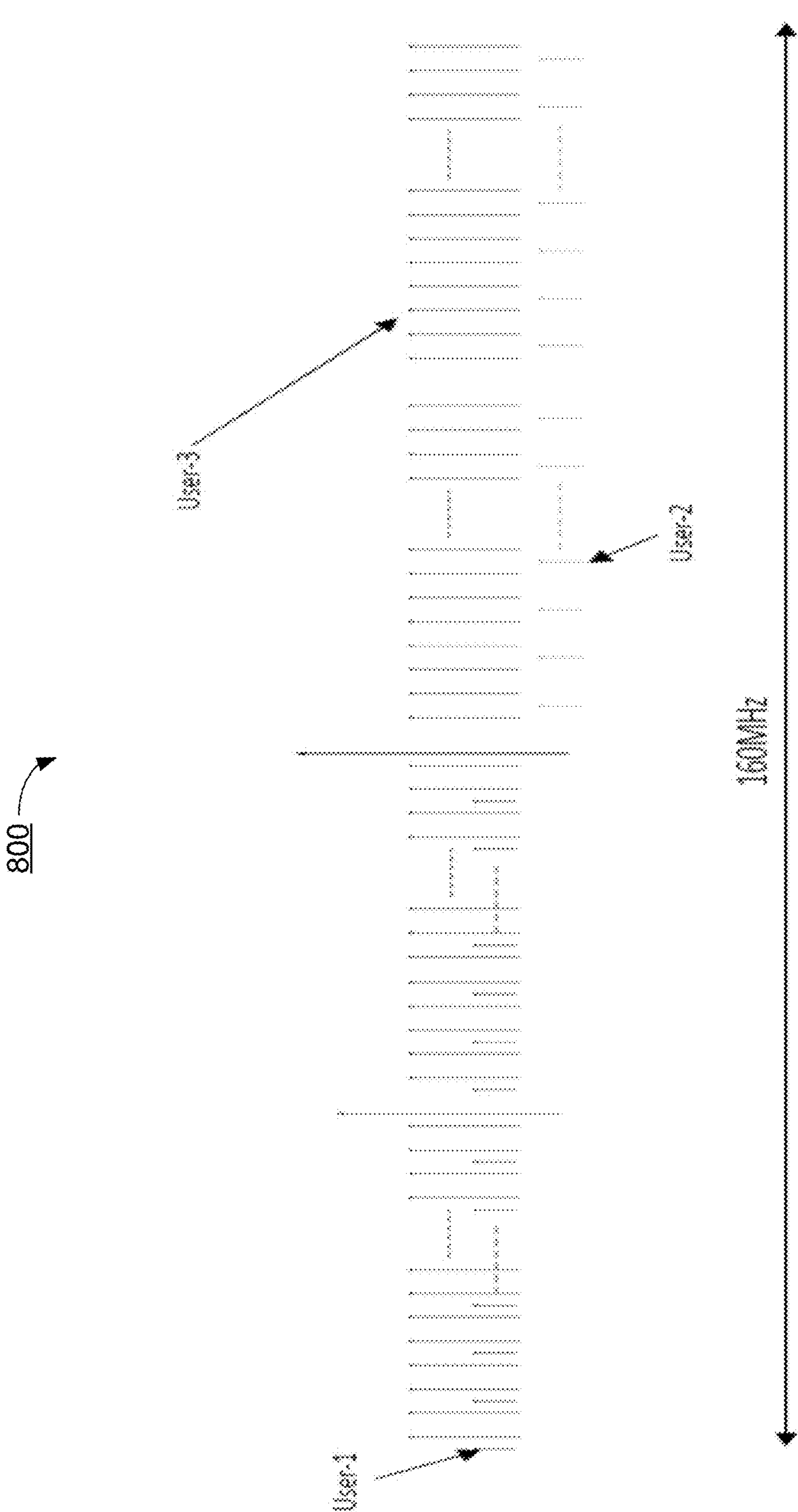
FIG. 8 is a diagram of an example scenario in accordance with an implementation of the present disclosure.

FIG. 8 illustrates an example scenario 800 under a proposed scheme in accordance with the present disclosure. Scenario 800 may pertain to dRU with mixed-distribution bandwidth OFDMA on BW160. Referring to FIG. 8, a first dRU242 for a first user (User-1) may be distributed over a primary 80 MHz frequency segment or subblock of the BW160, a second dRU242 for a second user (User-2) may be distributed over a secondary 80 MHz frequency segment or subblock of the BW160, and a dRU996 for a third user (User-3) may be distributed over the entire BW160.

Figure 9:
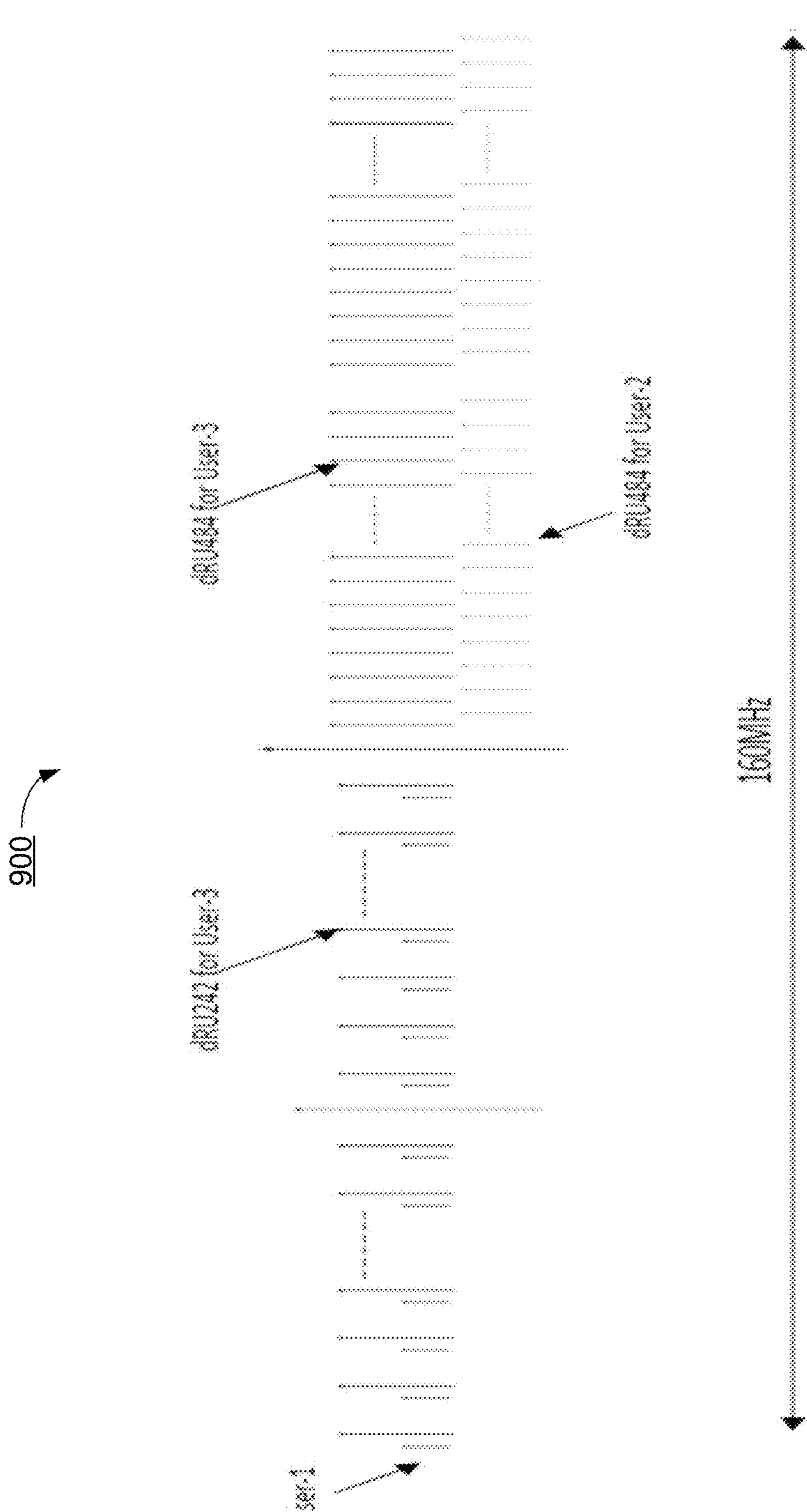
FIG. 9 is a diagram of an example scenario in accordance with an implementation of the present disclosure.

FIG. 9 illustrates an example scenario 900 under a proposed scheme in accordance with the present disclosure. Scenario 900 may pertain to dRU with mixed-distribution bandwidth OFDMA on BW160. Referring to FIG. 9, a first dRU242 for a first user (User-1) may be distributed over a primary 80 MHz frequency segment or subblock of the BW160, and a first dRU484 for a second user (User-2) may be distributed over a secondary 80 MHz frequency segment or subblock of the BW160. For a third user (User-3), a second dRU242 may be distributed over the primary 80 MHz frequency segment or subblock of the BW160 and a second dRU484 may be distributed over the secondary 80 MHz frequency segment or subblock of the BW160.

Figure 10:
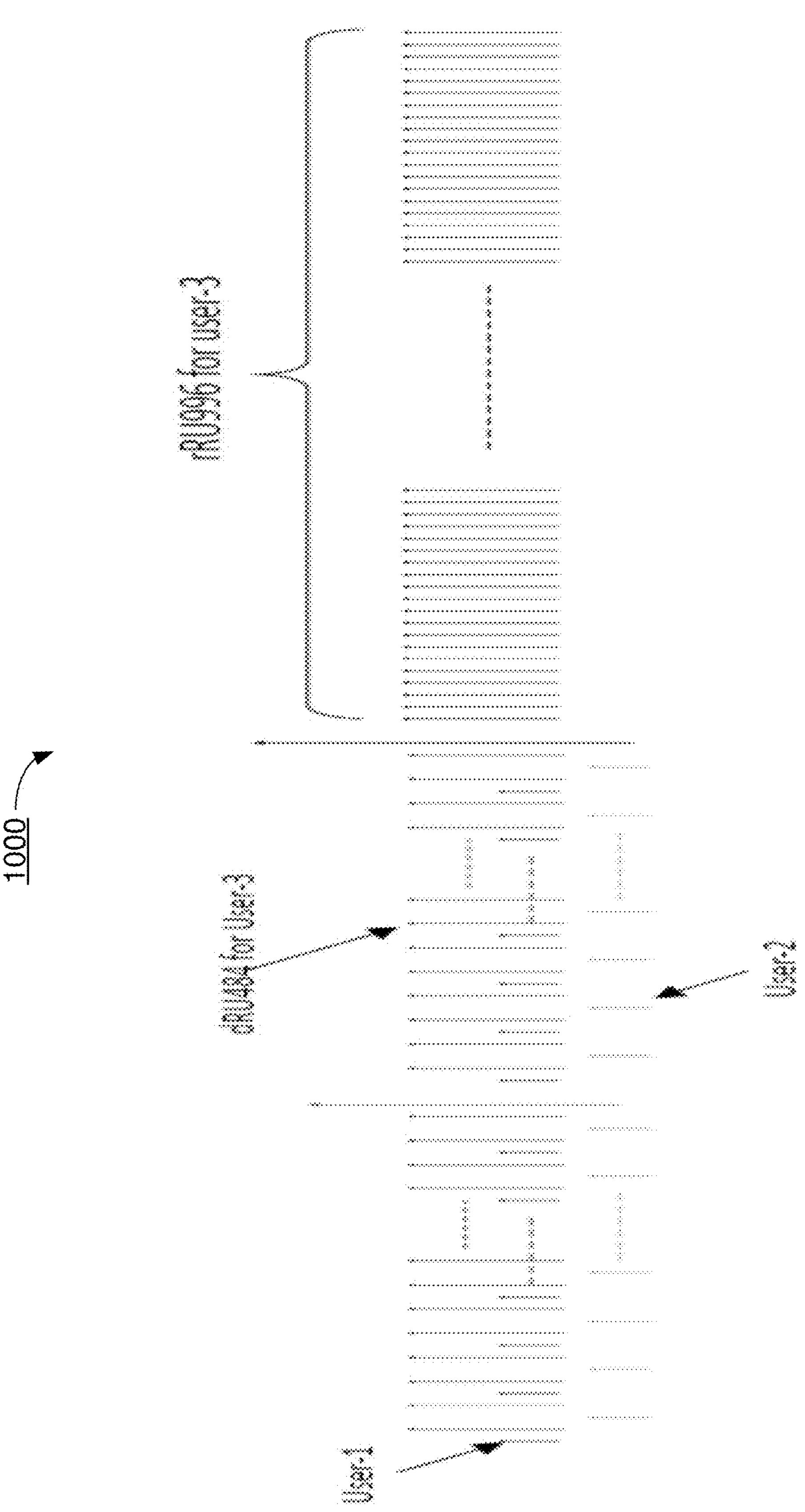
FIG. 10 is a diagram of an example scenario in accordance with an implementation of the present disclosure.

FIG. 10 illustrates an example scenario 1000 under a proposed scheme in accordance with the present disclosure. Scenario 1000 may pertain to mixed-MRU OFDMA on BW160. Referring to FIG. 10, a first dRU242 for a first user (User-1) may be distributed over a primary 80 MHz frequency segment or subblock of the BW160, and a second dRU242 for a second user (User-2) may be distributed over the primary 80 MHz frequency segment or subblock of the BW160. For a third user (User-3), a dRU484 may be distributed over the primary 80 MHz frequency segment or subblock of the BW160 and a rRU996 may be distributed over a secondary 80 MHz frequency segment or subblock of the BW160 (e.g., mixed-MRU (484+996)=dRU484+rRU996).

Figure 11:
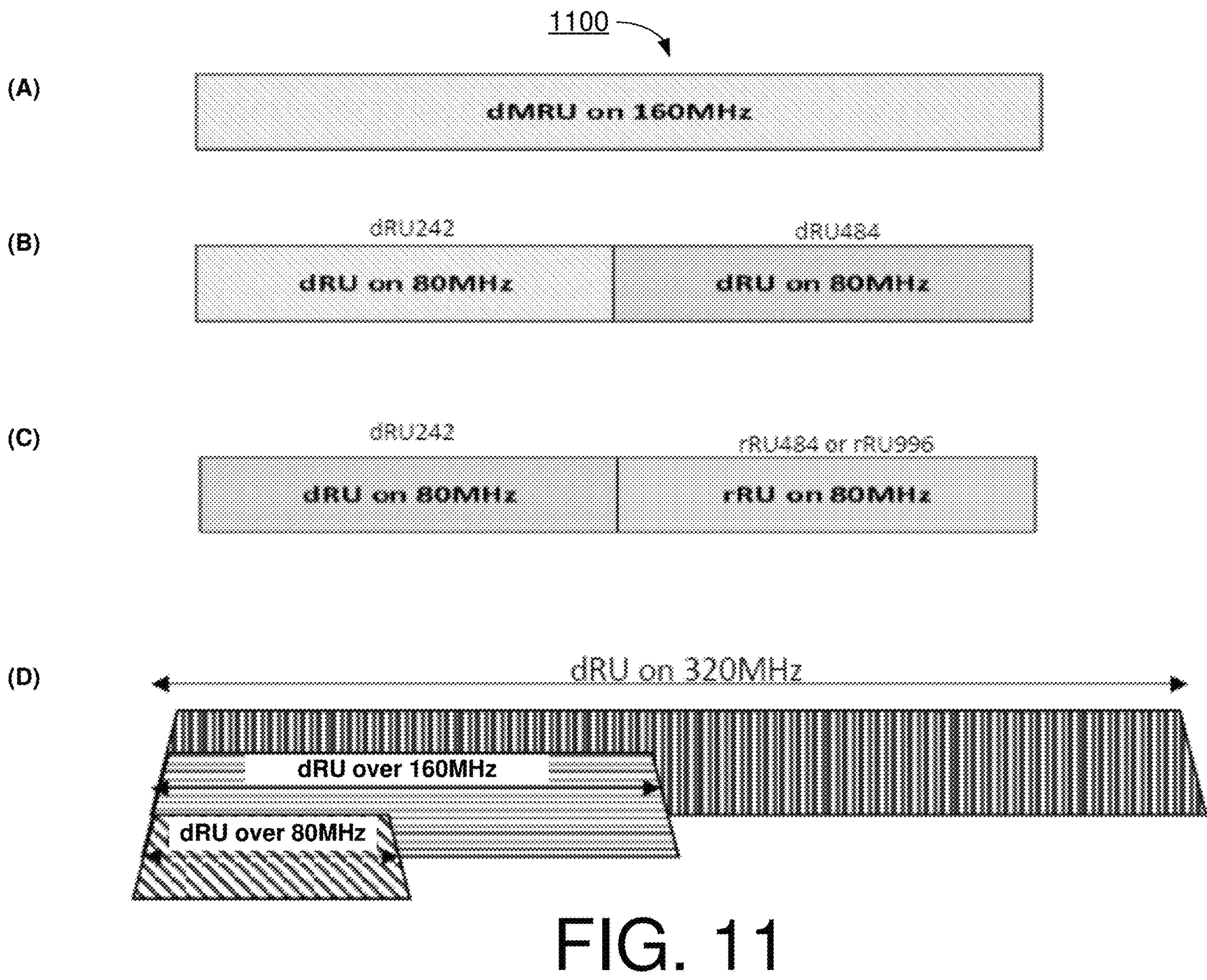
FIG. 11 is a diagram of an example scenario in accordance with an implementation of the present disclosure.

FIG. 11 illustrates an example scenario 1100 under a proposed scheme in accordance with the present disclosure. Scenario 1100 may pertain to other dRU and distributed-tone multi-RU (dMRU) operation modes on BW160 and/or BW320. Part (A) of FIG. 11 shows an example of a dMRU (242+484) distributed on a BW160. Part (B) of FIG. 11 shows an example of a dRU242 and a dRU484 for a given user (e.g., STA) respectively distributed over a first 80 MHz frequency segment or subblock and a second 80 MHz frequency segment or subblock of the BW160. Part (C) of FIG. 11 shows an example of a dRU242 and a rRU484 (or a dRU484 and a rRU996) for a given user (e.g., STA) respectively distributed over a first 80 MHz frequency segment or subblock and a second 80 MHz frequency segment or subblock of the BW160. Part (D) of FIG. 11 shows an example of mixed-distribution of dRUs on a 80 MHz subblock, a 160 MHz subblock and a 320 MHz subblock.

Figure 12:
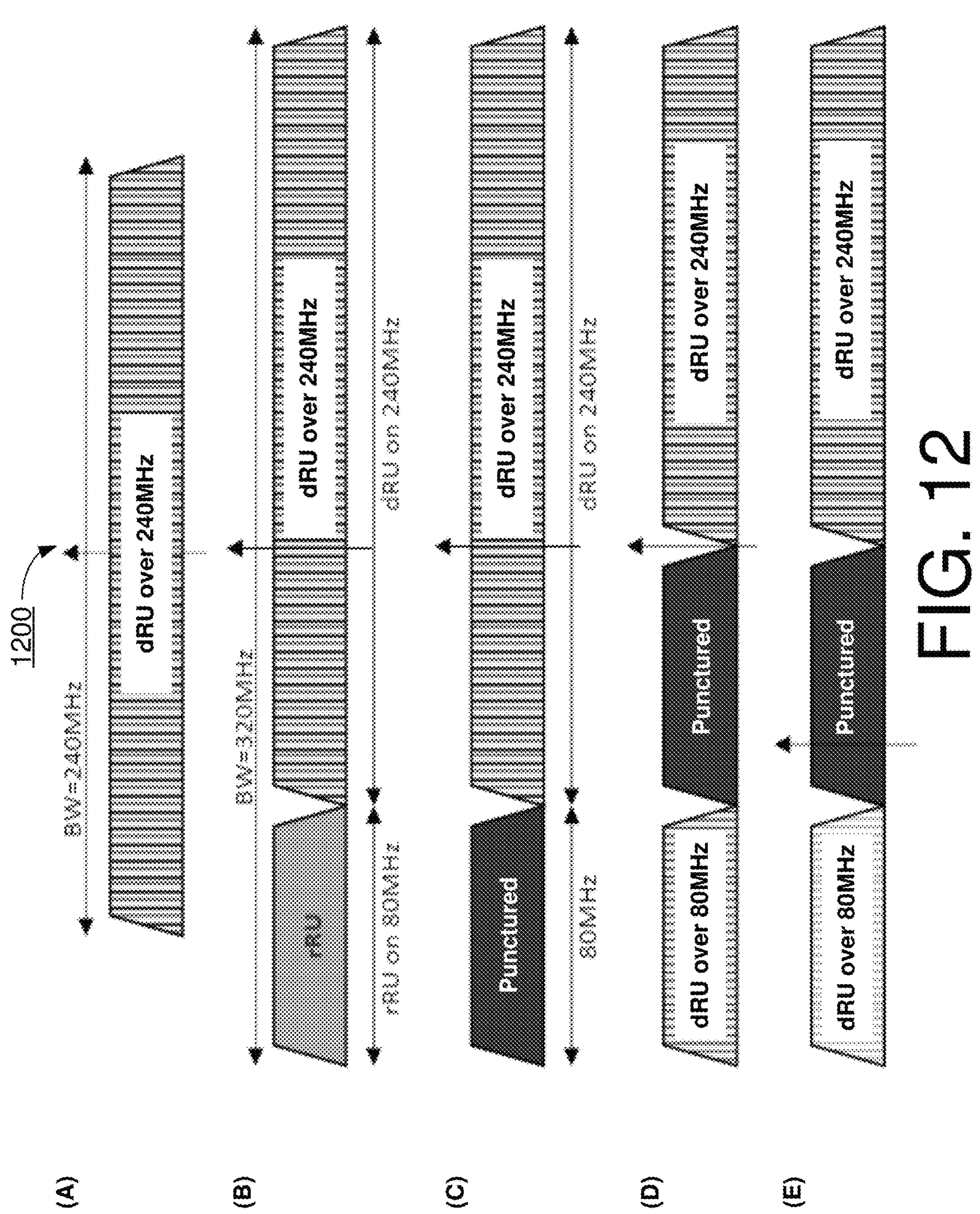
FIG. 12 is a diagram of an example scenario in accordance with an implementation of the present disclosure.

FIG. 12 illustrates an example scenario 1200 under a proposed scheme in accordance with the present disclosure. Scenario 1200 may pertain to operation scenarios for 240 MHz dRU. Part (A) of FIG. 12 shows an example of dRU distribution on a contiguous BW240. Part (B) of FIG. 12 shows an example of dRU distribution on a contiguous BW240 of a BW320, with a rRU on a remaining 80 MHz frequency segment or subblock of the BW320. Part (C) of FIG. 12 shows an example of dRU distribution on a contiguous BW240 of a BW320, with a remaining 80 MHz frequency segment or subblock of the BW320 punctured. Part (D) of FIG. 12 shows an example of dRU distribution on a non-contiguous BW240 of a BW320 (e.g., with the dRU distributed over (80+160) MHz subblocks), with a remaining BW80 of the BW320 punctured. Part (E) of FIG. 12 shows an example of dRU distribution separately on a BW80 and a BW160 of a BW320, with a remaining BW80 of the BW320 punctured.

Figure 13:
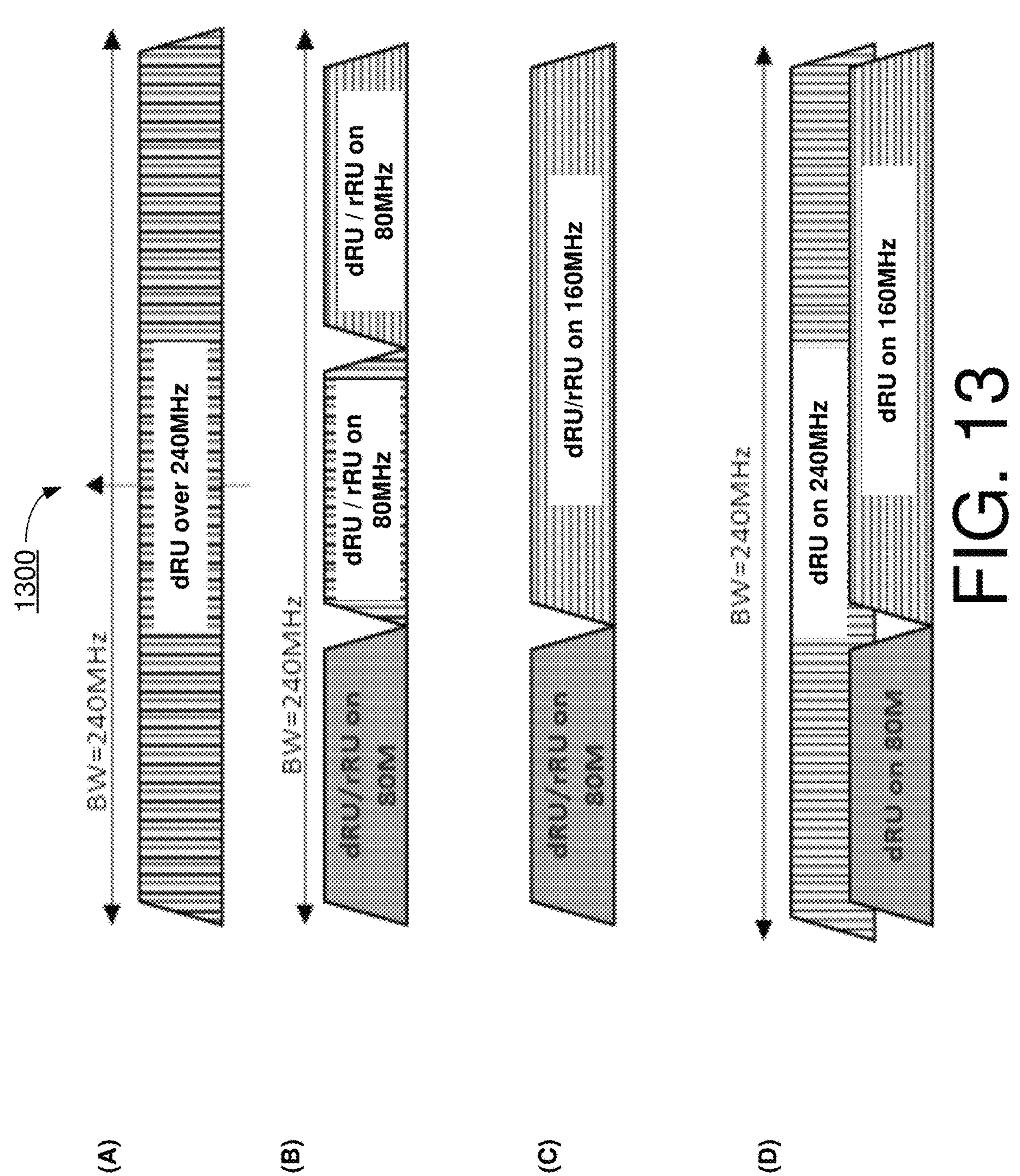
FIG. 13 is a diagram of an example scenario in accordance with an implementation of the present disclosure.

FIG. 13 illustrates an example scenario 1300 under a proposed scheme in accordance with the present disclosure. Scenario 1300 may pertain to dRU operation scenarios for BW240. Part (A) of FIG. 13 shows an example of dRU distribution on a contiguous BW240. Part (B) of FIG. 13 shows an example of hybrid (or mixed) operation mode of dRU and rRU on a per-80 MHz subblock basis on the BW240. Part (C) of FIG. 13 shows an example of hybrid (or mixed) operation mode of dRU and rRU on a per-80 MHz/160 MHz subblock basis on the BW240. Part (D) of FIG. 13 shows an example of mixed-(or mixed) operation mode of dRUs on a 80 MHz subblock, a 160 MHz subblock and the BW240.

Figure 14:
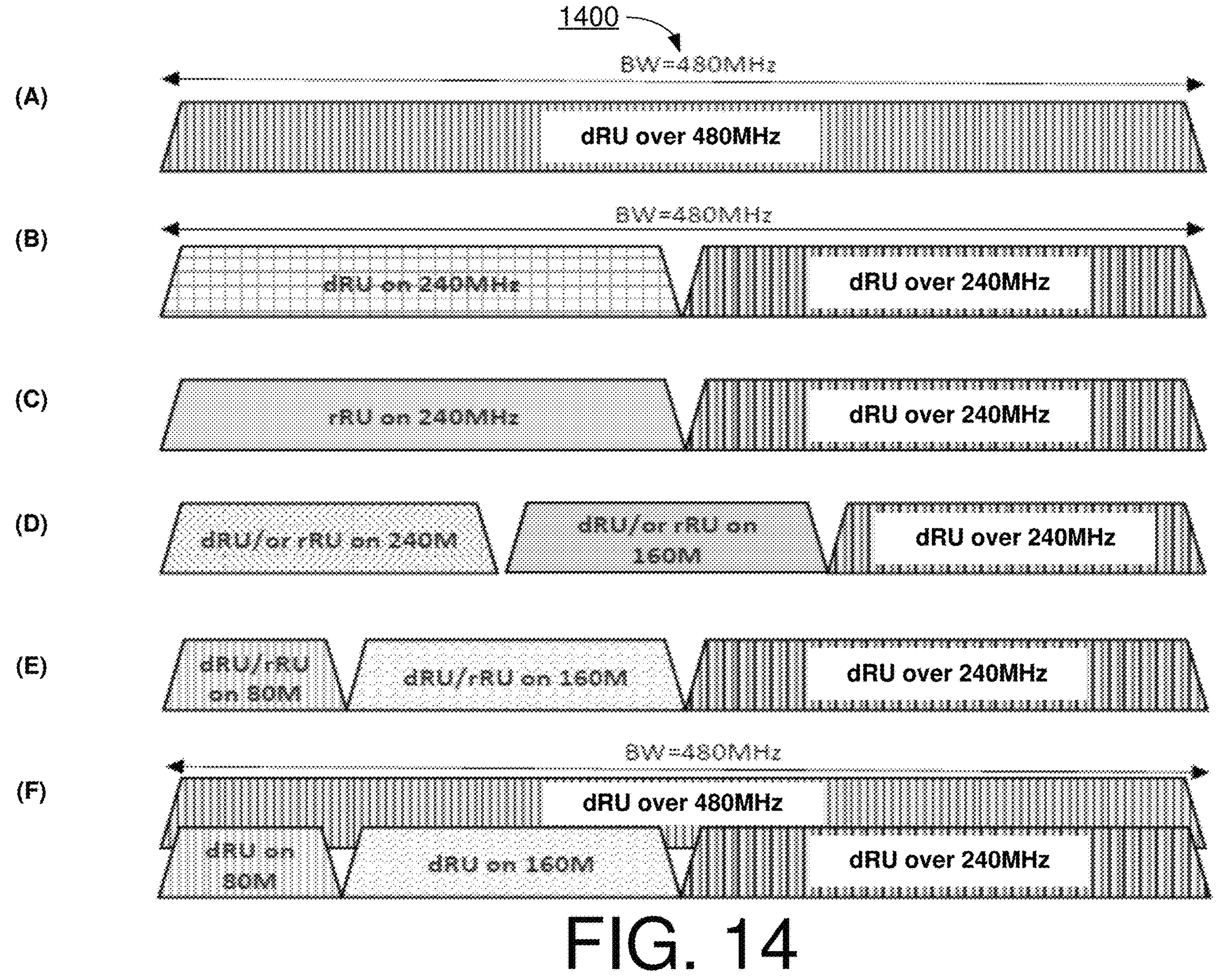
FIG. 14 is a diagram of an example scenario in accordance with an implementation of the present disclosure.

FIG. 14 illustrates an example scenario 1400 under a proposed scheme in accordance with the present disclosure. Scenario 1400 may pertain to dRU operation scenarios for BW480. Part (A) of FIG. 14 shows an example of dRU distribution on a contiguous BW480. Part (B) of FIG. 14 shows an example of dRUs distributed on a per-240 MHz segment basis on the BW480. Part (C) of FIG. 14 shows an example of hybrid (or mixed) operation mode of dRU and rRU on a per-240 MHz subblock basis on the BW480. Part (D) of FIG. 14 shows an example of hybrid (or mixed) operation mode of dRU and rRU on a per-160 MHz subblock basis on the BW480. Part (E) of FIG. 14 shows an example of hybrid (or mixed) operation mode of dRU and rRU on a per-80 MHz/160 MHz/240 MHz subblock basis on the BW480. Part (F) of FIG. 14 shows an example of mixed-distribution of dRUs on a 80 MHz subblock, a 160 MHz subblock, a 240 MHz subblock and the BW480.

Figure 15:
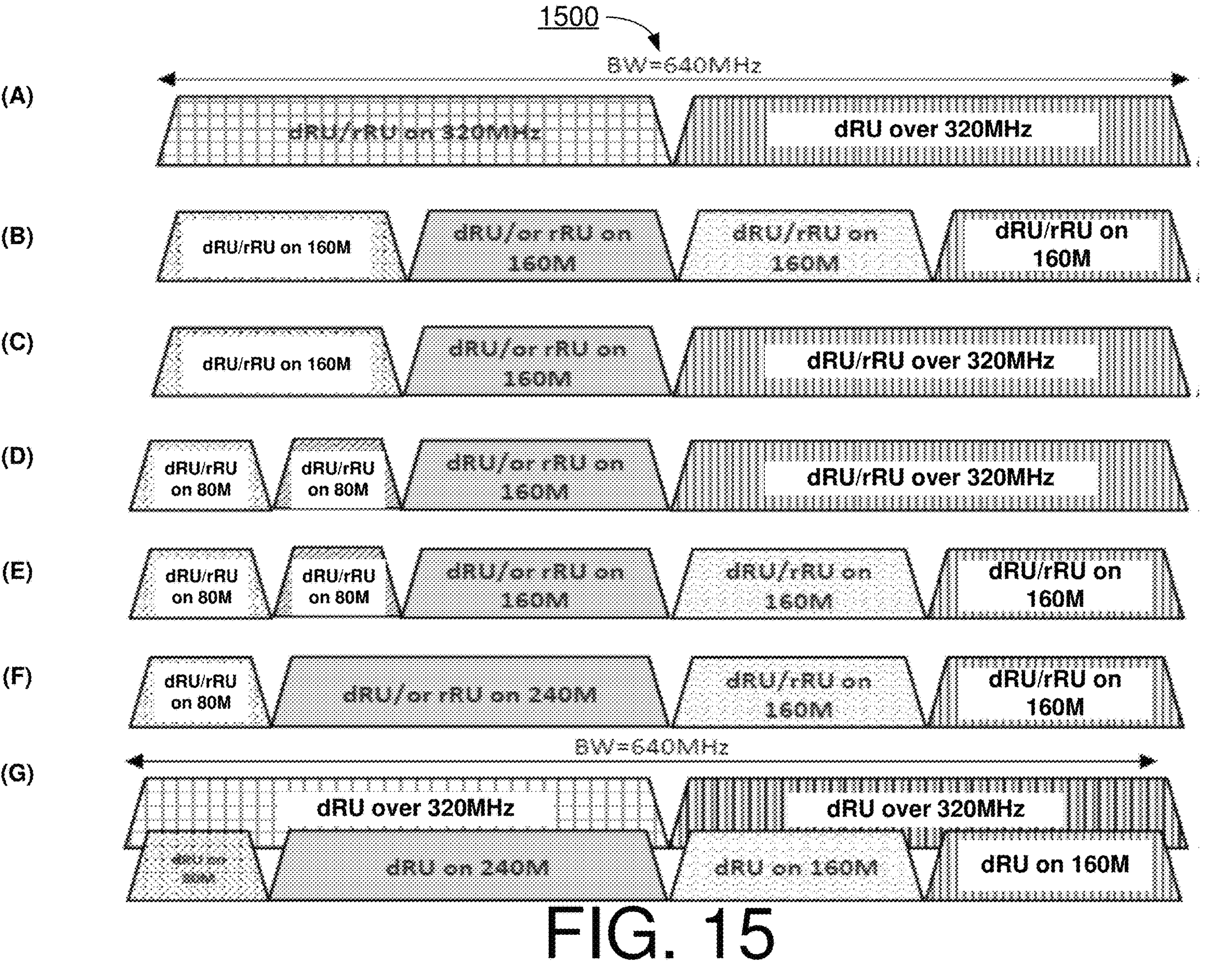
FIG. 15 is a diagram of an example scenario in accordance with an implementation of the present disclosure.

FIG. 15 illustrates an example scenario 1500 under a proposed scheme in accordance with the present disclosure. Scenario 1500 may pertain to dRU operation scenarios for BW640. Part (A) of FIG. 15 shows an example of dRU distribution or hybrid (or mixed) operation mode of dRU and rRU on a per-320 MHz segment basis on the BW640. Part (B) of FIG. 15 shows an example of dRU distribution or hybrid (or mixed) operation mode of dRU and rRU on a per-160 MHz segment basis on the BW640. Part (C) of FIG. 15 shows an example of dRU distribution or hybrid (or mixed) operation mode of dRU and rRU on a per-160 MHz/320 MHz segment basis on the BW640. Part (D) of FIG. 15 shows an example of dRU distribution or hybrid (or mixed) operation mode of dRU and rRU on a per-80 MHz/160 MHz/320 MHz segment basis on the BW640. Part (E) of FIG. 15 shows an example of dRU distribution or hybrid (or mixed) operation mode of dRU and rRU on a per-80 MHz/160 MHz segment basis on the BW640. Part (F) of FIG. 15 shows an example of dRU distribution or hybrid (or mixed) operation mode of dRU and rRU on a per-160 MHz/240 MHz segment basis on the BW640. Part (G) of FIG. 15 shows an example of mixed-distribution of dRUs on a 80 MHz subblock, two 160 MHz subblocks, a 240 MHz subblock, and two 320 MHz segments of the BW480.

Illustrative Implementations

Figure 16:
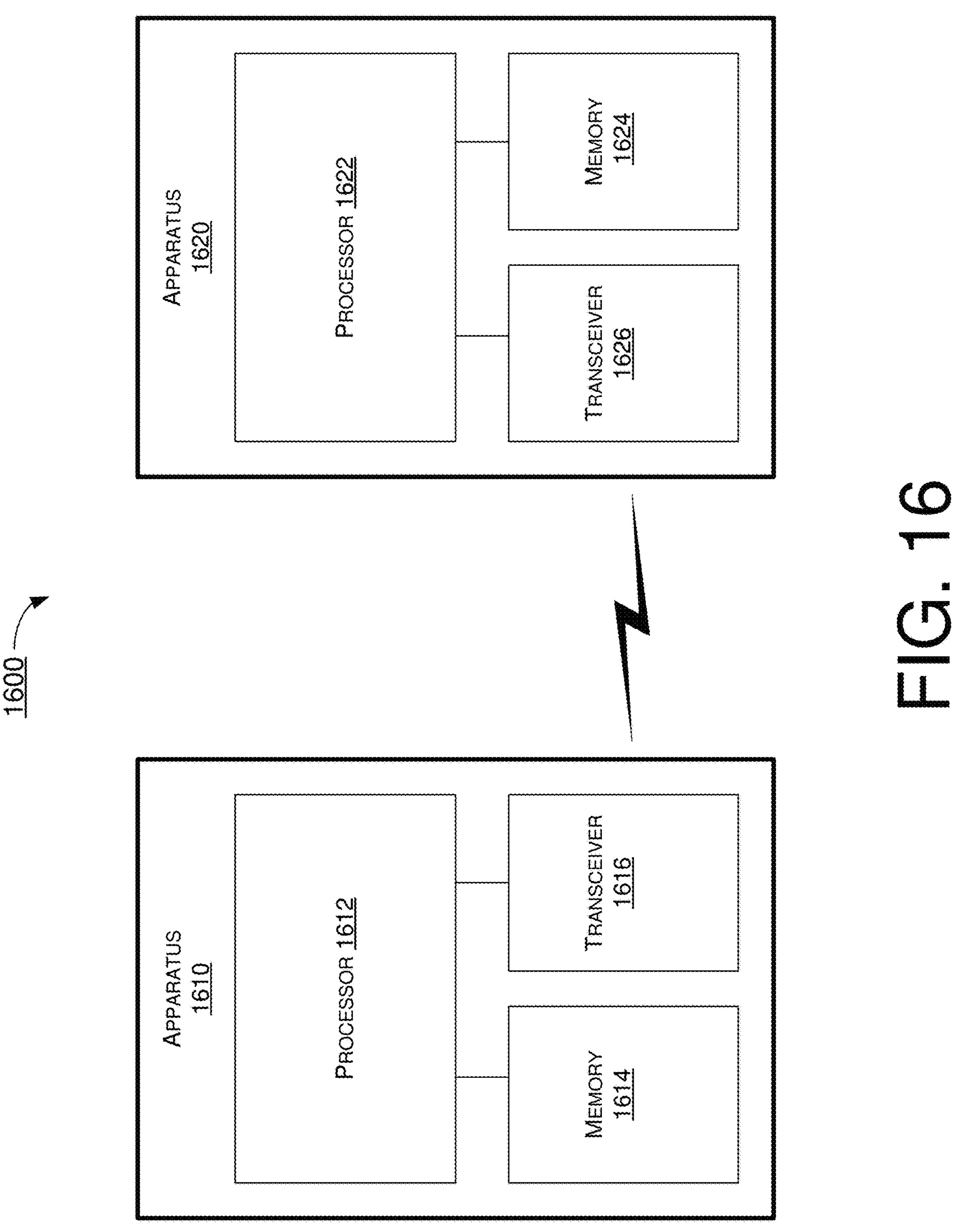
FIG. 16 is a block diagram of an example communication system in accordance with an implementation of the present disclosure.

FIG. 16 illustrates an example system 1600 having at least an example apparatus 1610 and an example apparatus 1620 in accordance with an implementation of the present disclosure. Each of apparatus 1610 and apparatus 1620 may perform various functions to implement schemes, techniques, processes and methods described herein pertaining to dRU operation for wide bandwidths next-generation WLAN systems, including the various schemes described above with respect to various proposed designs, concepts, schemes, systems and methods described above as well as processes described below. For instance, apparatus 1610 may be an example implementation of communication entity 110, and apparatus 1620 may be an example implementation of communication entity 120.

Each of apparatus 1610 and apparatus 1620 may be a part of an electronic apparatus, which may be a STA or an AP, such as a portable or mobile apparatus, a wearable apparatus, a wireless communication apparatus or a computing apparatus. For instance, each of apparatus 1610 and apparatus 1620 may be implemented in a smartphone, a smart watch, a personal digital assistant, a digital camera, or a computing equipment such as a tablet computer, a laptop computer or a notebook computer. Each of apparatus 1610 and apparatus 1620 may also be a part of a machine type apparatus, which may be an IoT apparatus such as an immobile or a stationary apparatus, a home apparatus, a wire communication apparatus or a computing apparatus. For instance, each of apparatus 1610 and apparatus 1620 may be implemented in a smart thermostat, a smart fridge, a smart door lock, a wireless speaker or a home control center. When implemented in or as a network apparatus, apparatus 1610 and/or apparatus 1620 may be implemented in a network node, such as an AP in a WLAN.

In some implementations, each of apparatus 1610 and apparatus 1620 may be implemented in the form of one or more integrated-circuit (IC) chips such as, for example and without limitation, one or more single-core processors, one or more multi-core processors, one or more reduced-instruction set computing (RISC) processors, or one or more complex-instruction-set-computing (CISC) processors. In the various schemes described above, each of apparatus 1610 and apparatus 1620 may be implemented in or as a STA or an AP. Each of apparatus 1610 and apparatus 1620 may include at least some of those components shown in FIG. 16 such as a processor 1612 and a processor 1622, respectively, for example. Each of apparatus 1610 and apparatus 1620 may further include one or more other components not pertinent to the proposed scheme of the present disclosure (e.g., internal power supply, display device and/or user interface device), and, thus, such component(s) of apparatus 1610 and apparatus 1620 are neither shown in FIG. 16 nor described below in the interest of simplicity and brevity.

In one aspect, each of processor 1612 and processor 1622 may be implemented in the form of one or more single-core processors, one or more multi-core processors, one or more RISC processors or one or more CISC processors. That is, even though a singular term "a processor" is used herein to refer to processor 1612 and processor 1622, each of processor 1612 and processor 1622 may include multiple processors in some implementations and a single processor in other implementations in accordance with the present disclosure. In another aspect, each of processor 1612 and processor 1622 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 1612 and processor 1622 is a special-purpose machine specifically designed, arranged and configured to perform specific tasks including those pertaining to dRU operation for wide bandwidths next-generation WLAN systems in accordance with various implementations of the present disclosure. For instance, each of processor 1612 and processor 1622 may be configured with hardware components, or circuitry, implementing one, some or all of the examples described and illustrated herein.

In some implementations, apparatus 1610 may also include a transceiver 1616 coupled to processor 1612. Transceiver 1616 may be capable of wirelessly transmitting and receiving data. In some implementations, apparatus 1620 may also include a transceiver 1626 coupled to processor 1622. Transceiver 1626 may include a transceiver capable of wirelessly transmitting and receiving data.

In some implementations, apparatus 1610 may further include a memory 1614 coupled to processor 1612 and capable of being accessed by processor 1612 and storing data therein. In some implementations, apparatus 1620 may further include a memory 1624 coupled to processor 1622 and capable of being accessed by processor 1622 and storing data therein. Each of memory 1614 and memory 1624 may include a type of random-access memory (RAM) such as dynamic RAM (DRAM), static RAM (SRAM), thyristor RAM (T-RAM) and/or zero-capacitor RAM (Z-RAM). Alternatively, or additionally, each of memory 1614 and memory 1624 may include a type of read-only memory (ROM) such as mask ROM, programmable ROM (PROM), erasable programmable ROM (EPROM) and/or electrically erasable programmable ROM (EEPROM). Alternatively, or additionally, each of memory 1614 and memory 1624 may include a type of non-volatile random-access memory (NVRAM) such as flash memory, solid-state memory, ferroelectric RAM (FeRAM), magnetoresistive RAM (MRAM) and/or phase-change memory.

Each of apparatus 1610 and apparatus 1620 may be a communication entity capable of communicating with each other using various proposed schemes in accordance with the present disclosure. For illustrative purposes and without limitation, a description of capabilities of apparatus 1610, as STA 110, and apparatus 1620, as STA 120, is provided below in the context of example process 1700. It is noteworthy that, although a detailed description of capabilities, functionalities and/or technical features of apparatus 1610 is provided below, the same may be applied to apparatus 1620 although a detailed description thereof is not provided solely in the interest of brevity. It is also noteworthy that, although the example implementations described below are provided in the context of WLAN, the same may be implemented in other types of networks.

Illustrative Processes

FIG. 17 illustrates an example process 1700 in accordance with an implementation of the present disclosure. Process 1700 may represent an aspect of implementing various proposed designs, concepts, schemes, systems and methods described above. More specifically, process 1700 may represent an aspect of the proposed concepts and schemes pertaining to dRU operation for wide bandwidths next-generation WLAN systems in accordance with the present disclosure. Process 1700 may include one or more operations, actions, or functions as illustrated by one or more of blocks 1710 and 1720. Although illustrated as discrete blocks, various blocks of process 1700 may be divided into additional blocks, combined into fewer blocks, or eliminated, depending on the desired implementation. Moreover, the blocks/sub-blocks of process 1700 may be executed in the order shown in FIG. 17 or, alternatively, in a different order. Furthermore, one or more of the blocks/sub-blocks of process 1700 may be executed repeatedly or iteratively. Process 1700 may be implemented by or in apparatus 1610 and apparatus 1620 as well as any variations thereof. Solely for illustrative purposes and without limiting the scope, process 1700 is described below in the context of apparatus 1610 as communication entity 110 (e.g., a transmitting device whether a STA or an AP) and apparatus 1620 as communication entity 120 (e.g., a receiving device whether a STA or an AP) of a wireless network such as a WLAN in accordance with one or more of IEEE 802.11 standards. Process 1700 may begin at block 1710.

At 1710, process 1700 may involve processor 1612 of apparatus 1610 generating at least one dRU or both the at least one dRU and at least one rRU. Process 1700 may proceed from 1710 to 1720.

At 1720, process 1700 may involve processor 1612 communicating, via transceiver 1616, wirelessly using the at least one dRU or using the at least one dRU and the at least one rRU in a 160 MHz, 240 MHz, 320 MHz, 480 MHz or 640 MHz bandwidth.

In some implementations, in generating, process 1700 may involve processor 1612 generating the at least one dRU. Moreover, in communicating wirelessly, process 1700 may involve processor 1612 communicating wirelessly using the at least one dRU on an entirety of the 160 MHz, 240 MHz, 320 MHz, 480 MHz or 640 MHz bandwidth.

In some implementations, in generating the at least one dRU, process 1700 may involve processor 1612 generating multiple dRUs. Moreover, in communicating wirelessly, process 1700 may involve processor 1612 communicating wirelessly in the 160 MHz bandwidth using the multiple dRUs: (a) in a per-80 MHz operation mode in which each of the multiple dRUs is used on a respective 80 MHz segment of the 160 MHz bandwidth; or (b) in a punctured mode in which one of the multiple dRUs is used on a first 80 MHz segment of the 160 MHz and one or more dRUs of the multiple dRUs are used on a second 80 MHz segment which is punctured; or (c) in a mixed-distribution mode in which one of the multiple dRUs is used on an entirety of the 160 MHz bandwidth and one or more other dRUs of the multiple dRUs are used on one or more 80 MHz segments of the 160 MHz bandwidth.

In some implementations, in generating the at least one dRU, process 1700 may involve processor 1612 generating multiple dRUs. Moreover, in communicating wirelessly, process 1700 may involve processor 1612 communicating wirelessly in the 320 MHz bandwidth using the multiple dRUs: (a) in a per-80 MHz operation mode in which each of the multiple dRUs is used on a respective 80 MHz segment of the 320 MHz bandwidth; or (b) in a per-160 MHz operation mode in which each of the multiple dRUs is used on a respective 160 MHz segment of the 320 MHz bandwidth; or (c) in a mixed-distribution mode in which one of the multiple dRUs is used on an entirety of the 320 MHz bandwidth and one or more other dRUs of the multiple dRUs are used on: (i) one or more 80 MHz segments of the 320 MHz bandwidth; or (ii) one or more 160 MHz segments of the 320 MHz bandwidth; or (iii) a 240 MHz segment of the 320 MHz bandwidth; or (iv) any combination thereof.

In some implementations, in communicating wirelessly, process 1700 may involve processor 1612 communicating wirelessly in the 240 MHz bandwidth using the at least one dRU: (a) on a continuous 240 MHz bandwidth or distributed on a non-contiguous 240 MHz bandwidth comprising a 80 MHz segment and a 160 MHz segment; or (b) in a per-80 MHz operation mode in which each of multiple dRUs of the at least one dRU is used on a respective 80 MHz segment of the 240 MHz bandwidth; or (c) in a mixed-distribution mode in which one of the multiple dRUs is used on an entirety of the 240 MHz bandwidth and one or more other dRUs of the at least one dRU are used on: (i) one or more 80 MHz segments of the 240 MHz bandwidth; or (ii) a 160 MHz segment of the 240 MHz bandwidth; or (iii) any combination thereof.

In some implementations, in generating the at least one dRU, process 1700 may involve processor 1612 generating multiple dRUs. Moreover, in communicating wirelessly, process 1700 may involve processor 1612 communicating wirelessly in the 480 MHz bandwidth using the multiple dRUs: (a) in a per-240 MHz operation mode in which each of the multiple dRUs is used on a respective 240 MHz segment of the 480 MHz bandwidth; or (b) in a per-160 MHz operation mode in which each of the multiple dRUs is used on a respective 160 MHz segment of the 480 MHz bandwidth; or (c) in a mixed-distribution mode in which a first dRU of the multiple dRUs is used on a 80 MHz segment of the 480 MHz bandwidth, a second dRU of the multiple dRUs is used on a 160 MHz segment of the 480 MHz bandwidth, and a third dRU of the multiple dRUs is used on a 240 MHz segment of the 480 MHz bandwidth; or (d) in another mixed-distribution mode in which one of the multiple dRUs is used on an entirety of the 480 MHz bandwidth and one or more other dRUs of the multiple dRUs are used on: (i) one or more 80 MHz segments of the 480 MHz bandwidth; or (ii) one or more 160 MHz segments of the 480 MHz bandwidth; or (iii) one or more 240 MHz segments of the 480 MHz bandwidth; or (iv) any combination thereof.

In some implementations, in generating the at least one dRU, process 1700 may involve processor 1612 generating multiple dRUs. Moreover, in communicating wirelessly, process 1700 may involve processor 1612 communicating wirelessly in the 640 MHz bandwidth using the multiple dRUs: (a) in a per-320 MHz operation mode in which each of the multiple dRUs is used on a respective 320 MHz segment of the 640 MHz bandwidth; or (b) in a per-160 MHz operation mode in which each of the multiple dRUs is used on a respective 160 MHz segment of the 640 MHz bandwidth; or (c) in a per-160 MHz and 320 MHz operation mode in which each of the multiple dRUs is used on the respective 160 MHz segment and a 320 MHz segment of the 640 MHz bandwidth; or (d) in a per-80 MHz, 160 MHz and 320 MHz operation mode in which each of the multiple dRUs is used on a respective 80 MHz segment, the respective 160 MHz segment and the 320 MHz segment of the 640 MHz bandwidth; or (e) in a per-80 MHz and 160 MHz operation mode in which each of the multiple dRUs is used on the respective 80 MHz segment and the respective 160 MHz segment of the 640 MHz bandwidth; or (f) in a per-80 MHz, 160 MHz and 240 MHz operation mode in which each of the multiple dRUs is used on the respective 80 MHz segment, the respective 160 MHz segment and a 240 MHz segment of the 640 MHz bandwidth; or (g) in another mixed-distribution mode in which one of the multiple dRUs is used on: (i) one or more 80 MHz segments of the 640 MHz bandwidth; or (ii) one or more 160 MHz segments of the 640 MHz bandwidth; or (iii) one or more 240 MHz segments of the 640 MHz bandwidth; or (iv) one or more 320 MHz segments of the 640 MHz bandwidth; or (v) any combination thereof.

In some implementations, in communicating wirelessly, process 1700 may involve processor 1612 communicating wirelessly in a hybrid or mixed operation mode using the at least one dRU and the at least one rRU: (a) in a per-80 MHz operation mode in which each of the at least one dRU and the at least one rRU is used on a respective 80 MHz segment of the 160 MHz bandwidth; or (b) in a per-160 MHz operation mode in which each of the at least one dRU and the at least one rRU is used on a respective 160 MHz segment of the 320 MHz bandwidth; or (c) in the per-80 MHz operation mode in which each of the at least one dRU and the at least one rRU is used on a respective 80 MHz segment of the 320 MHz bandwidth; or (d) in a per-240 MHz operation mode in which each of the at least one dRU and the at least one rRU is used on a respective 240 MHz segment of the 480 MHz bandwidth; or (e) in a per-320 MHz operation mode in which each of the at least one dRU and the at least one rRU is used on a respective 320 MHz segment of the 640 MHz bandwidth; or (f) in a per-160 MHz operation mode in which each of the at least one dRU and the at least one rRU is used on a respective 160 MHz segment of the 640 MHz bandwidth; or (g) in a per-160 MHz and 320 MHz operation mode in which each of the at least one dRU and the at least one rRU is used on the respective 160 MHz segment and the 320 MHz segment of the 640 MHz bandwidth; or (h) in a per-80 MHz, 160 MHz and 320 MHz operation mode in which each of the at least one dRU and the at least one rRU is used on the respective 80 MHz segment, the respective 160 MHz segment and the 320 MHz segment of the 640 MHz bandwidth; or (j) in a per-80 MHz and 160 MHz operation mode in which each of the at least one dRU and the at least one rRU is used on the respective 80 MHz segment and the respective 160 MHz segment of the 640 MHz bandwidth; or (k) in a per-80 MHz, 160 MHz and 240 MHz operation mode in which each of the at least one dRU and the at least one rRU is used on the respective 80 MHz segment, the respective 160 MHz segment and a 240 MHz segment of the 640 MHz bandwidth.

In some implementations, in communicating wirelessly, process 1700 may involve processor 1612 communicating wirelessly using the at least one dRU and the at least one rRU: (a) in a mixed-distribution mode in which a first dRU or rRU of the at least one dRU and the at least one rRU is used on a 80 MHz segment of the 480 MHz bandwidth, a second dRU or rRU of the at least one dRU and the at least one rRU is used on a 160 MHz segment of the 480 MHz bandwidth, and a third dRU and rRU of the at least one dRU and the at least one rRU is used on a 240 MHz segment of the 480 MHz bandwidth; or (b) in a mixed-distribution mode in which one of the at least one dRU and the at least one rRU is used on an entirety of the 320 MHz bandwidth and one or more other of the at least one dRU and the at least one rRU are used on: (i) one or more 80 MHz segments of the 320 MHz bandwidth; or (ii) one or more 160 MHz segments of the 320 MHz bandwidth; or (iii) a 240 MHz segment of the 320 MHz bandwidth; or (iv) any combination thereof.

In some implementations, in communicating wirelessly, process 1700 may involve processor 1612 communicating wirelessly in a 6 GHz LPI system.

ADDITIONAL NOTES

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:

generating at least one distributed-tone resource unit (dRU) or both the at least one dRU and at least one regular resource unit (rRU); and communicating wirelessly using the at least one dRU or using the at least one dRU and the at least one rRU in a 160 MHz, 240 MHz, 320 MHz, 480 MHz or 640 MHz bandwidth, wherein the communicating wirelessly comprises communicating wirelessly using the at least one dRU and the at least one rRU:

in a mixed-distribution mode in which a first dRU or rRU of the at least one dRU and the at least one rRU is used on a 80 MHz segment of the 480 MHz bandwidth, a second dRU or rRU of the at least one dRU and the at least one rRU is used on a 160 MHz segment of the 480 MHz bandwidth, and a third dRU and rRU of the at least one dRU and the at least one rRU is used on a 240 MHz segment of the 480 MHz bandwidth; or in a mixed-distribution mode in which one of the at least one dRU and the at least one rRU is used on an entirety of the 320 MHz bandwidth and one or more other of the at least one dRU and the at least one rRU are used on:

one or more 80 MHz segments of the 320 MHz bandwidth; or one or more 160 MHz segments of the 320 MHz bandwidth; or a 240 MHz segment of the 320 MHz bandwidth; or any combination thereof.

2. The method of claim 1, wherein the generating comprises generating the at least one dRU, and wherein the communicating wirelessly comprises communicating wirelessly using the at least one dRU on an entirety of the 160 MHz, 240 MHz, 320 MHz, 480 MHz or 640 MHz bandwidth.

3. The method of claim 1, wherein the generating the at least one dRU comprises generating multiple dRUs, and wherein the communicating wirelessly further comprises communicating wirelessly in the 160 MHz bandwidth using the multiple dRUs:

in a per-80 MHz operation mode in which each of the multiple dRUs is used on a respective 80 MHz segment of the 160 MHz bandwidth; or in a punctured mode in which one of the multiple dRUs is used on a first 80 MHz segment of the 160 MHz and one or more dRUs of the multiple dRUs are used on a second 80 MHz segment which is punctured; or in a mixed-distribution mode in which one of the multiple dRUs is used on an entirety of the 160 MHz bandwidth and one or more other dRUs of the multiple dRUs are used on one or more 80 MHz segments of the 160 MHz bandwidth.

4. The method of claim 1, wherein the generating the at least one dRU comprises generating multiple dRUs, and wherein the communicating wirelessly further comprises communicating wirelessly in the 320 MHz bandwidth using the multiple dRUs:

in a per-80 MHz operation mode in which each of the multiple dRUs is used on a respective 80 MHz segment of the 320 MHz bandwidth; or in a per-160 MHz operation mode in which each of the multiple dRUs is used on a respective 160 MHz segment of the 320 MHz bandwidth; or in a mixed-distribution mode in which one of the multiple dRUs is used on an entirety of the 320 MHz bandwidth and one or more other dRUs of the multiple dRUs are used on:

the one or more 80 MHz segments of the 320 MHz bandwidth; or the one or more 160 MHz segments of the 320 MHz bandwidth; or the 240 MHz segment of the 320 MHz bandwidth; or any combination thereof.

5. The method of claim 1, wherein the communicating wirelessly further comprises communicating wirelessly in the 240 MHz bandwidth using the at least one dRU:

on a continuous 240 MHz bandwidth or distributed on a non-contiguous 240 MHz bandwidth comprising a 80 MHz segment and a 160 MHz segment; or in a per-80 MHz operation mode in which each of multiple dRUs of the at least one dRU is used on a respective 80 MHz segment of the 240 MHz bandwidth; or in a mixed-distribution mode in which one of the multiple dRUs is used on an entirety of the 240 MHz bandwidth and one or more other dRUs of the at least one dRU are used on:

one or more 80 MHz segments of the 240 MHz bandwidth; or a 160 MHz segment of the 240 MHz bandwidth; or any combination thereof.

6. The method of claim 1, wherein the generating the at least one dRU comprises generating multiple dRUs, and wherein the communicating wirelessly further comprises communicating wirelessly in the 480 MHz bandwidth using the multiple dRUs:

in a per-240 MHz operation mode in which each of the multiple dRUs is used on a respective 240 MHz segment of the 480 MHz bandwidth; or in a per-160 MHz operation mode in which each of the multiple dRUs is used on a respective 160 MHz segment of the 480 MHz bandwidth; or in a mixed-distribution mode in which a first dRU of the multiple dRUs is used on a 80 MHz segment of the 480 MHz bandwidth, a second dRU of the multiple dRUs is used on a 160 MHz segment of the 480 MHz bandwidth, and a third dRU of the multiple dRUs is used on a 240 MHz segment of the 480 MHz bandwidth; or in another mixed-distribution mode in which one of the multiple dRUs is used on an entirety of the 480 MHz bandwidth and one or more other dRUs of the multiple dRUs are used on:

one or more 80 MHz segments of the 480 MHz bandwidth; or one or more 160 MHz segments of the 480 MHz bandwidth; or one or more 240 MHz segments of the 480 MHz bandwidth; or any combination thereof.

7. The method of claim 1, wherein the generating the at least one dRU comprises generating multiple dRUs, and wherein the communicating wirelessly further comprises communicating wirelessly in the 640 MHz bandwidth using the multiple dRUs:

in a per-320 MHz operation mode in which each of the multiple dRUs is used on a respective 320 MHz segment of the 640 MHz bandwidth; or in a per-160 MHz operation mode in which each of the multiple dRUs is used on a respective 160 MHz segment of the 640 MHz bandwidth; or in a per-160 MHz and 320 MHz operation mode in which each of the multiple dRUs is used on the respective 160 MHz segment and a 320 MHz segment of the 640 MHz bandwidth; or in a per-80 MHz, 160 MHz and 320 MHz operation mode in which each of the multiple dRUs is used on a respective 80 MHz segment, the respective 160 MHz segment and the 320 MHz segment of the 640 MHz bandwidth; or in a per-80 MHz and 160 MHz operation mode in which each of the multiple dRUs is used on the respective 80 MHz segment and the respective 160 MHz segment of the 640 MHz bandwidth; or in a per-80 MHz, 160 MHz and 240 MHz operation mode in which each of the multiple dRUs is used on the respective 80 MHz segment, the respective 160 MHz segment and a 240 MHz segment of the 640 MHz bandwidth; or in another mixed-distribution mode in which one of the multiple dRUs is used on:

one or more 80 MHz segments of the 640 MHz bandwidth; or one or more 160 MHz segments of the 640 MHz bandwidth; or one or more 240 MHz segments of the 640 MHz bandwidth; or one or more 320 MHz segments of the 640 MHz bandwidth; or any combination thereof.

8. The method of claim 1, wherein the communicating wirelessly further comprises communicating wirelessly in a hybrid or mixed operation mode using the at least one dRU and the at least one rRU:

in a per-80 MHz operation mode in which each of the at least one dRU and the at least one rRU is used on a respective 80 MHz segment of the 160 MHz bandwidth; or in a per-160 MHz operation mode in which each of the at least one dRU and the at least one rRU is used on a respective 160 MHz segment of the 320 MHz bandwidth; or in the per-80 MHz operation mode in which each of the at least one dRU and the at least one rRU is used on a respective 80 MHz segment of the 320 MHz bandwidth; or in a per-240 MHz operation mode in which each of the at least one dRU and the at least one rRU is used on a respective 240 MHz segment of the 480 MHz bandwidth; or in a per-320 MHz operation mode in which each of the at least one dRU and the at least one rRU is used on a respective 320 MHz segment of the 640 MHz bandwidth; or in a per-160 MHz operation mode in which each of the at least one dRU and the at least one rRU is used on a respective 160 MHz segment of the 640 MHz bandwidth; or in a per-160 MHz and 320 MHz operation mode in which each of the at least one dRU and the at least one rRU is used on the respective 160 MHz segment and the 320 MHz segment of the 640 MHz bandwidth; or in a per-80 MHz, 160 MHz and 320 MHz operation mode in which each of the at least one dRU and the at least one rRU is used on the respective 80 MHz segment, the respective 160 MHz segment and the 320 MHz segment of the 640 MHz bandwidth; or in a per-80 MHz and 160 MHz operation mode in which each of the at least one dRU and the at least one rRU is used on the respective 80 MHz segment and the respective 160 MHz segment of the 640 MHz bandwidth; or in a per-80 MHz, 160 MHz and 240 MHz operation mode in which each of the at least one dRU and the at least one rRU is used on the respective 80 MHz segment, the respective 160 MHz segment and a 240 MHz segment of the 640 MHz bandwidth.

9. The method of claim 1, wherein the communicating wirelessly comprises communicating wirelessly in a 6 GHz low-power indoor (LPI) system according to an Institute of Electrical and Electronics Engineers (IEEE) standard.

10. An apparatus, comprising:

a transceiver configured to communicate wirelessly; and a processor coupled to the transceiver and configured to perform operations comprising:

generating at least one distributed-tone resource unit (dRU) or both the at least one dRU and at least one regular resource unit (rRU); and communicating, via the transceiver, using the at least one dRU or using the at least one dRU and the at least one rRU in a 160 MHz, 240 MHz, 320 MHz, 480 MHz or 640 MHz bandwidth, wherein the communicating wirelessly comprises communicating wirelessly using the at least one dRU and the at least one rRU:

in a mixed-distribution mode in which a first dRU or rRU of the at least one dRU and the at least one rRU is used on a 80 MHz segment of the 480 MHz bandwidth, a second dRU or rRU of the at least one dRU and the at least one rRU is used on a 160 MHz segment of the 480 MHz bandwidth, and a third dRU and rRU of the at least one dRU and the at least one rRU is used on a 240 MHz segment of the 480 MHz bandwidth; or in a mixed-distribution mode in which one of the at least one dRU and the at least one rRU is used on an entirety of the 320 MHz bandwidth and one or more other of the at least one dRU and the at least one rRU are used on:

one or more 80 MHz segments of the 320 MHz bandwidth; or one or more 160 MHz segments of the 320 MHz bandwidth; or a 240 MHz segment of the 320 MHz bandwidth; or any combination thereof.

11. The apparatus of claim 10, wherein the generating comprises generating the at least one dRU, and wherein the communicating wirelessly comprises communicating wirelessly using the at least one dRU on an entirety of the 160 MHz, 240 MHz, 320 MHz, 480 MHz or 640 MHz bandwidth.

12. The apparatus of claim 10, wherein the generating the at least one dRU comprises generating multiple dRUs, and wherein the communicating wirelessly further comprises communicating wirelessly in the 160 MHz bandwidth using the multiple dRUs:

in a per-80 MHz operation mode in which each of the multiple dRUs is used on a respective 80 MHz segment of the 160 MHz bandwidth; or in a punctured mode in which one of the multiple dRUs is used on a first 80 MHz segment of the 160 MHz and one or more dRUs of the multiple dRUs are used on a second 80 MHz segment which is punctured; or in a mixed-distribution mode in which one of the multiple dRUs is used on an entirety of the 160 MHz bandwidth and one or more other dRUs of the multiple dRUs are used on one or more 80 MHz segments of the 160 MHz bandwidth.

13. The apparatus of claim 10, wherein the generating the at least one dRU comprises generating multiple dRUs, and wherein the communicating wirelessly further comprises communicating wirelessly in the 320 MHz bandwidth using the multiple dRUs:

in a per-80 MHz operation mode in which each of the multiple dRUs is used on a respective 80 MHz segment of the 320 MHz bandwidth; or in a per-160 MHz operation mode in which each of the multiple dRUs is used on a respective 160 MHz segment of the 320 MHz bandwidth; or in a mixed-distribution mode in which one of the multiple dRUs is used on an entirety of the 320 MHz bandwidth and one or more other dRUs of the multiple dRUs are used on:

the one or more 80 MHz segments of the 320 MHz bandwidth; or the one or more 160 MHz segments of the 320 MHz bandwidth; or the 240 MHz segment of the 320 MHz bandwidth; or any combination thereof.

14. The apparatus of claim 10, wherein the communicating wirelessly further comprises communicating wirelessly in the 240 MHz bandwidth using the at least one dRU:

on a continuous 240 MHz bandwidth or distributed on a non-contiguous 240 MHz bandwidth comprising a 80 MHz segment and a 160 MHz segment; or in a per-80 MHz operation mode in which each of multiple dRUs of the at least one dRU is used on a respective 80 MHz segment of the 240 MHz bandwidth; or in a mixed-distribution mode in which one of the multiple dRUs is used on an entirety of the 240 MHz bandwidth and one or more other dRUs of the at least one dRU are used on:

one or more 80 MHz segments of the 240 MHz bandwidth; or a 160 MHz segment of the 240 MHz bandwidth; or any combination thereof.

15. The apparatus of claim 10, wherein the generating the at least one dRU comprises generating multiple dRUs, and wherein the communicating wirelessly further comprises communicating wirelessly in the 480 MHz bandwidth using the multiple dRUs:

in a per-240 MHz operation mode in which each of the multiple dRUs is used on a respective 240 MHz segment of the 480 MHz bandwidth; or in a per-160 MHz operation mode in which each of the multiple dRUs is used on a respective 160 MHz segment of the 480 MHz bandwidth; or in a mixed-distribution mode in which a first dRU of the multiple dRUs is used on a 80 MHz segment of the 480 MHz bandwidth, a second dRU of the multiple dRUs is used on a 160 MHz segment of the 480 MHz bandwidth, and a third dRU of the multiple dRUs is used on a 240 MHz segment of the 480 MHz bandwidth; or in another mixed-distribution mode in which one of the multiple dRUs is used on an entirety of the 480 MHz bandwidth and one or more other dRUs of the multiple dRUs are used on:

one or more 80 MHz segments of the 480 MHz bandwidth; or one or more 160 MHz segments of the 480 MHz bandwidth; or one or more 240 MHz segments of the 480 MHz bandwidth; or any combination thereof.

16. The apparatus of claim 10, wherein the generating the at least one dRU comprises generating multiple dRUs, and wherein the communicating wirelessly further comprises communicating wirelessly in the 640 MHz bandwidth using the multiple dRUs:

in a per-320 MHz operation mode in which each of the multiple dRUs is used on a respective 320 MHz segment of the 640 MHz bandwidth; or in a per-160 MHz operation mode in which each of the multiple dRUs is used on a respective 160 MHz segment of the 640 MHz bandwidth; or in a per-160 MHz and 320 MHz operation mode in which each of the multiple dRUs is used on the respective 160 MHz segment and a 320 MHz segment of the 640 MHz bandwidth; or in a per-80 MHz, 160 MHz and 320 MHz operation mode in which each of the multiple dRUs is used on a respective 80 MHz segment, the respective 160 MHz segment and the 320 MHz segment of the 640 MHz bandwidth; or in a per-80 MHz and 160 MHz operation mode in which each of the multiple dRUs is used on the respective 80 MHz segment and the respective 160 MHz segment of the 640 MHz bandwidth; or in a per-80 MHz, 160 MHz and 240 MHz operation mode in which each of the multiple dRUs is used on the respective 80 MHz segment, the respective 160 MHz segment and a 240 MHz segment of the 640 MHz bandwidth; or in another mixed-distribution mode in which one of the multiple dRUs is used on:

one or more 80 MHz segments of the 640 MHz bandwidth; or one or more 160 MHz segments of the 640 MHz bandwidth; or one or more 240 MHz segments of the 640 MHz bandwidth; or one or more 320 MHz segments of the 640 MHz bandwidth; or any combination thereof.

17. The apparatus of claim 10, wherein the communicating wirelessly further comprises communicating wirelessly in a hybrid or mixed operation mode using the at least one dRU and the at least one rRU:

in a per-80 MHz operation mode in which each of the at least one dRU and the at least one rRU is used on a respective 80 MHz segment of the 160 MHz bandwidth; or in a per-160 MHz operation mode in which each of the at least one dRU and the at least one rRU is used on a respective 160 MHz segment of the 320 MHz bandwidth; or in the per-80 MHz operation mode in which each of the at least one dRU and the at least one rRU is used on a respective 80 MHz segment of the 320 MHz bandwidth; or in a per-240 MHz operation mode in which each of the at least one dRU and the at least one rRU is used on a respective 240 MHz segment of the 480 MHz bandwidth; or in a per-320 MHz operation mode in which each of the at least one dRU and the at least one rRU is used on a respective 320 MHz segment of the 640 MHz bandwidth; or in a per-160 MHz operation mode in which each of the at least one dRU and the at least one rRU is used on a respective 160 MHz segment of the 640 MHz bandwidth; or in a per-160 MHz and 320 MHz operation mode in which each of the at least one dRU and the at least one rRU is used on the respective 160 MHz segment and the 320 MHz segment of the 640 MHz bandwidth; or in a per-80 MHz, 160 MHz and 320 MHz operation mode in which each of the at least one dRU and the at least one rRU is used on the respective 80 MHz segment, the respective 160 MHz segment and the 320 MHz segment of the 640 MHz bandwidth; or in a per-80 MHz and 160 MHz operation mode in which each of the at least one dRU and the at least one rRU is used on the respective 80 MHz segment and the respective 160 MHz segment of the 640 MHz bandwidth; or in a per-80 MHz, 160 MHz and 240 MHz operation mode in which each of the at least one dRU and the at least one rRU is used on the respective 80 MHz segment, the respective 160 MHz segment and a 240 MHz segment of the 640 MHz bandwidth.

18. The apparatus of claim 10, wherein the communicating wirelessly comprises communicating wirelessly in a 6 GHz low-power indoor (LPI) system according to an Institute of Electrical and Electronics Engineers (IEEE) standard.

* * * * *